(12) United States Patent
Uhr et al.

(10) Patent No.: US 11,961,057 B2
(45) Date of Patent: *Apr. 16, 2024

(54) METHOD FOR PAYING COST OF IOT DEVICE BASED ON BLOCKCHAIN AND MERKLE TREE STRUCTURE RELATED THERETO, AND SERVER, SERVICE PROVIDING TERMINAL, AND DIGITAL WALLET USING THE SAME

(71) Applicant: Coinplug, Inc., Gyeonggi-do (KR)

(72) Inventors: Joon Sun Uhr, Gyeonggi-do (KR); Jay Wu Hong, Seoul (KR)

(73) Assignee: CPLABS, INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/535,170

(22) Filed: Nov. 24, 2021

(65) Prior Publication Data

US 2022/0083993 A1 Mar. 17, 2022

Related U.S. Application Data

(62) Division of application No. 15/975,714, filed on May 9, 2018, now Pat. No. 11,244,295.

(30) Foreign Application Priority Data

May 10, 2017 (KR) .......... 10-2017-0058015

(51) Int. Cl.
*G06Q 20/10* (2012.01)
*G06F 16/22* (2019.01)
(Continued)

(52) U.S. Cl.
CPC ....... *G06Q 20/102* (2013.01); *G06F 16/2246* (2019.01); *G06Q 20/14* (2013.01);
(Continued)

(58) Field of Classification Search
CPC .... G06Q 20/102; G06Q 20/14; G06Q 20/145; G06Q 20/367; G06Q 20/382;
(Continued)

(56) References Cited

U.S. PATENT DOCUMENTS 5,892,900 A * 4/1999 Ginter ............... G06F 21/78
726/26
10,291,477 B1 * 5/2019 Askar ............... H04W 4/50
(Continued)

FOREIGN PATENT DOCUMENTS

KR 101661933 10/2016
KR 1020160131572 11/2016
(Continued)

OTHER PUBLICATIONS

Wu, Lijun, et al. "Democratic centralism: a hybrid blockchain architecture and its applications in energy internet." 2017 IEEE International Conference on Energy Internet (ICEI). IEEE, 2017.
(Continued)

*Primary Examiner* — Patrick McAtee
*Assistant Examiner* — Vincent I Idiake
(74) *Attorney, Agent, or Firm* — Husch Blackwell LLP

(57) ABSTRACT

A method of a payment for an Internet of Things (IoT) device is provided. The method includes steps of: a payment supporting server (a) on condition that the payment supporting server has registered certificates of the IoT device, a service providing device, and a digital wallet in a first blockchain, manages their transaction IDs, has registered a representative hash value in a second blockchain, manages their transaction IDs, and manages link information between the IoT device and the digital wallet, confirming validity of a billing transaction, and (b) acquiring identification information on the digital wallet; and (c) paying the billing detail using the digital wallet, registering its payment result in the
(Continued)

first blockchain, registering in the second blockchain, if one anchoring condition is satisfied, a first representative hash value, and transmitting the payment result to the service providing device, the IoT device, and the digital wallet.

6 Claims, 10 Drawing Sheets

(51) Int. Cl.
| | |
|---|---|
| *G06F 16/27* | (2019.01) |
| *G06Q 20/14* | (2012.01) |
| *G06Q 20/36* | (2012.01) |
| *G06Q 20/38* | (2012.01) |
| *H04L 9/06* | (2006.01) |
| *H04L 9/32* | (2006.01) |

(52) U.S. Cl.
CPC ......... *G06Q 20/145* (2013.01); *G06Q 20/367* (2013.01); *G06Q 20/382* (2013.01); *G06Q 20/3825* (2013.01); *G06Q 20/3827* (2013.01); *H04L 9/0637* (2013.01); *H04L 9/0643* (2013.01); *H04L 9/3265* (2013.01); *G06F 16/27* (2019.01); *G06Q 2220/00* (2013.01)

(58) Field of Classification Search
CPC ........... G06Q 20/3825; G06Q 20/3827; G06Q 2220/00; G06Q 20/065; G06Q 20/308; G06Q 20/3674; G06F 16/2246; G06F 16/27; H04L 9/0637; H04L 9/0643; H04L 9/3265; H04W 4/70
See application file for complete search history.

(56) References Cited

U.S. PATENT DOCUMENTS

| | | | | |
|---|---|---|---|---|
| 10,673,617 | B1* | 6/2020 | Antoniou | G06F 13/4282 |
| 2016/0342989 | A1* | 11/2016 | Davis | G06Q 20/405 |
| 2017/0132621 | A1* | 5/2017 | Miller | H04L 9/0637 |
| 2018/0183587 | A1* | 6/2018 | Won | G06F 21/44 |
| 2018/0254905 | A1* | 9/2018 | Chun | H04L 9/3273 |

FOREIGN PATENT DOCUMENTS

| | | |
|---|---|---|
| KR | 101735708 | 5/2017 |
| WO | 2015144971 A1 | 10/2015 |
| WO | 2017006134 A1 | 1/2017 |

OTHER PUBLICATIONS

Swan, Melanie. Blockchain: Blueprint for a new economy. "O'Reilly Media, Inc.", 2015.
Antonopoulos, Andreas M. Mastering Bitcoin: unlocking digital cryptocurrencies. "O'Reilly Media, Inc.", Dec. 20, 2014.
Crosby, et al., 2015."Blockchain Technology: Beyond Bitcoin.". Sutardja Center for Entrepreneurship & Technology Technical Report. http://scet.berkeley.edu/wp-content/uploads/BlockchainPaper.pdf., Oct. 16, 2015.
Pasquale, et al. "Beyond Bitcoin—Part I: A critical look at blockchain-based systems." IACR Cryptology ePrint Archive 2015 (Dec. 1, 2015): 1164.
Panikkar, Sanjay, et al. "Adept: An iot practitioner perspective." Draft Copy for Advance Review, IBM (Jan. 7, 2015).
Choi Young-Jin, It started from financial markets and spread to IoT, https://jmagazine.joins.com/forbes/view/316035, Mar. 23, 2017.

* cited by examiner

METHOD FOR PAYING COST OF IOT DEVICE BASED ON BLOCKCHAIN AND MERKLE TREE STRUCTURE RELATED THERETO, AND SERVER, SERVICE PROVIDING TERMINAL, AND DIGITAL WALLET USING THE SAME

CROSS REFERENCE TO RELATED APPLICATION

This application is a divisional of U.S. patent application Ser. No. 15/975,714, filed May 9, 2018, which itself claims priority to Korean patent application no. 10-2017-0058015 filed May 10, 2017, both of which are hereby incorporated by reference.

FIELD OF THE INVENTION

The present invention relates to a method of a payment for an Internet of Things (IoT) device; and more particularly, to the method of (a) a payment supporting server, on condition that the payment supporting server (i) has registered a certificate of the IoT device, a certificate of a service providing device, and a certificate of a digital wallet of a user in a first blockchain database, (ii) manages their corresponding first, second, and third blockchain transaction IDs, (iii) has registered a representative hash value or its processed value calculated by using (iii-1) specific hash values acquired by applying a hash function to each of the certificates and (iii-2) at least one neighboring hash value corresponding to each of the specific hash values, in a second blockchain database, (iv) manages their corresponding fourth, fifth, and sixth blockchain transaction IDs, and (v) manages link information on a link between information on the IoT device and information on the digital wallet as a payer therefor, if a billing transaction which refers to information on the payer is acquired from the service providing device, confirming or supporting another device to confirm validity of the billing transaction, wherein the billing transaction includes identification information on the service providing device, identification information on the IoT device, a billing detail, and a signature value for billing acquired by signing the billing detail with the certificate of the service providing device, and wherein the information on the payer includes the identification information on the IoT device, and is received from the IoT device in response to a request for the information on the payer from the service providing device; (b) the payment supporting server acquiring or supporting another device to acquire identification information on the digital wallet corresponding to the identification information on the IoT device included in the billing transaction from the first blockchain database by referring to the link information; and (c) the payment supporting server performing or supporting another device to perform processes of (i) allowing the billing detail to be paid for by using the digital wallet corresponding to the identification information on the digital wallet acquired from the first blockchain database, (ii) registering a payment result including a payment detail corresponding to the billing detail in the first blockchain database and managing its corresponding first blockchain transaction ID of the payment result, (iii) registering in the second blockchain database, if one of anchoring conditions for registering a hash value in the second blockchain database is satisfied, a first representative hash value or its processed value calculated by using (iii-1) a first specific hash value acquired by applying the hash function to the payment result and (iii-2) its corresponding at least one neighboring hash value, and managing its corresponding second blockchain transaction ID of the payment result, and (iv) transmitting the payment result to at least one of the service providing device, the IoT device, and the digital wallet; and the payment supporting server, the service providing device, and the digital wallet using the same.

BACKGROUND OF THE INVENTION

As the number of Internet of Things (IoT) devices is increasing, its usability is also expanding, and such Internet of Things are applied to home appliances, health care, homecare, vehicles, transportation, construction, agriculture, environment, entertainment, energy, food, and virtually all of the world.

Especially, in recent years, IoT services combined with a mobile payment service are increasing.

For example, a hands-free payment service in which a customer who just entered the store is recognized through communication with the customer's device and the customer only has to authenticate a purchase for payment using a smart-phone and the like, or an automated payment service for a taxi fare by a user device is currently in use.

However, such conventional technology is based on the mobile payment service, in which a user is charged for a cost generated at an IoT device, and the cost is paid by using the mobile payment service, in which case, the payment is made using direct communication between a service provider and the user device.

Therefore, there is a security hazard that it is not easy for the user who is not registered in a payment system of the service provider through the user device, and also that user information is required for the payment.

SUMMARY OF THE INVENTION

It is an object of the present invention to solve all the aforementioned problems.

It is another object of the present invention to enable payment without any requirement of information on a user, etc.

It is still another object of the present invention to directly bill an IoT device of the user.

It is still yet another object of the present invention to enable efficient management of the IoT device with regard to the payment.

In accordance with one aspect of the present invention, there is provided a method for a payment for an Internet of Things (IoT) device, including steps of: (a) a payment supporting server, on condition that the payment supporting server (i) has registered a certificate of the IoT device, a certificate of a service providing device, and a certificate of a digital wallet of a user in a first blockchain database, (ii) manages their corresponding first, second, and third blockchain transaction IDs, (iii) has registered a representative hash value or its processed value calculated by using (iii-1) specific hash values acquired by applying a hash function to each of the certificates and (iii-2) at least one neighboring hash value corresponding to each of the specific hash values, in a second blockchain database, (iv) manages their corresponding fourth, fifth, and sixth blockchain transaction IDs, and (v) manages link information on a link between information on the IoT device and information on the digital wallet as a payer therefor, if a billing transaction which refers to information on the payer is acquired from the service providing device, confirming or supporting another device to confirm validity of the billing transaction, wherein the billing transaction includes identification information on the service providing device, identification information on the IoT device, a billing detail, and a signature value for billing acquired by signing the billing detail with the certificate of the service providing device, and wherein the information on the payer includes the identification information on the IoT device, and is received from the IoT device in response to a request for the information on the payer from the service providing device; (b) the payment supporting server acquiring or supporting another device to acquire identification information on the digital wallet corresponding to the identification information on the IoT device included in the billing transaction from the first blockchain database by referring to the link information; and (c) the payment supporting server performing or supporting another device to perform processes of (i) allowing the billing detail to be paid for by using the digital wallet corresponding to the identification information on the digital wallet acquired from the first blockchain database, (ii) registering a payment result including a payment detail corresponding to the billing detail in the first blockchain database and managing its corresponding first blockchain transaction ID of the payment result, (iii) registering in the second blockchain database, if one of anchoring conditions for registering a hash value in the second blockchain database is satisfied, a first representative hash value or its processed value calculated by using (iii-1) a first specific hash value acquired by applying the hash function to the payment result and (iii-2) its corresponding at least one neighboring hash value, and managing its corresponding second blockchain transaction ID of the payment result, and (iv) transmitting the payment result to at least one of the service providing device, the IoT device, and the digital wallet.

In accordance with another aspect of the present invention, there is provided a method for a payment for an Internet of Things (IoT) device, including steps of: (a) a service providing device, on condition that a payment supporting server (i) has registered a certificate of the IoT device, a certificate of a service providing device, and a certificate of a digital wallet of a user in a first blockchain database, (ii) manages their corresponding first, second, and third blockchain transaction IDs, (iii) has registered a representative hash value or its processed value calculated by using (iii-1) specific hash values acquired by applying a hash function to each of the certificates and (iii-2) at least one neighboring hash value corresponding to each of the specific hash values, in a second blockchain database, (iv) manages their corresponding fourth, fifth, and sixth blockchain transaction IDs, and (v) manages link information on a link between information on the IoT device and information on the digital wallet as a payer therefor, acquiring or supporting another device to acquire payer information, including identification information on the IoT device, from the IoT device; and (b) the service providing device, by referring to the acquired information on the payer, transmitting or supporting another device to transmit a billing transaction including the identification information on the service providing device, the identification information on the IoT device, a billing detail, and a signature value for billing acquired by signing the billing detail with the certificate of the service providing device to the payment supporting server, to thereby instruct the payment supporting server to (i) acquire the identification information on the digital wallet, corresponding to the identification information on the IoT device included in the billing transaction by referring to the link information, from the first blockchain database if the billing transaction is determined as valid, (ii) transmit a payment for the billing detail by using the digital wallet corresponding to the identification information on the digital wallet acquired from the first blockchain database, and (iii) register a payment result including a payment detail corresponding to the billing detail in the first blockchain database and manage its corresponding blockchain transaction ID of the payment result, or (iv) register in the second blockchain database, if one of the anchoring conditions is satisfied, a first representative hash value or its processed value calculated by using (iv-1) a first specific hash value acquired by applying the hash function to the payment result and (iv-2) its corresponding at least one neighboring hash value, and manage its corresponding second blockchain transaction ID of the payment result, and (v) transmit the payment result to at least one of the service providing device, the IoT device, and the digital wallet.

In accordance with still another aspect of the present invention, there is provided a method for a payment for an Internet of Things (IoT) device, including steps of: (a) a digital wallet of a user, on condition that a payment supporting server (I) has registered a certificate of the IoT device, a certificate of a service providing device, and a certificate of the digital wallet in a first blockchain database, and manages their corresponding first, second, and third blockchain transaction IDs, and (II) has registered a representative hash value or its processed value calculated by using (II-1) specific hash values acquired by applying a hash function to each of the certificates and (II-2) at least one neighboring hash value corresponding to each of the specific hash values, in a second blockchain database, and manages their corresponding fourth, fifth, and sixth blockchain transaction IDs, performing or supporting another device to perform processes of (i) acquiring identification information on the IoT device from the IoT device in response to a link-connection requesting signal from a user device, and displaying a confirmation requesting signal on whether a link between the IoT device and the digital wallet as a payer therefor is to be established on the user device, (ii) transmitting, if a link-connection instructing signal on the link is acquired from the user device, a link-connection requesting transaction to the payment supporting server, wherein the link-connection requesting transaction includes identification information on the digital wallet, the identification information on the IoT device, and a signature value for identification acquired by signing the identification information on the IoT device with the certificate of the digital wallet, to thereby allow the payment supporting server to (1) verify the IoT device corresponding to the identification information on the IoT device included in the link-connection requesting transaction, (2) connect the link if the IoT device is determined as valid, (3) register link information on the link in the first blockchain database and manage its corresponding first link-info blockchain transaction ID, (4) (4-1) register in the second blockchain database, if one of the anchoring conditions is satisfied, a fourth representative hash value or its processed value calculated by using (i) a fourth specific hash value acquired by applying the hash function to the link information and (ii) its corresponding at least one neighboring hash value, (4-2) manage its corresponding second link-info blockchain transaction ID, and (4-3) transmit the link information to at least one of the IoT device and the digital wallet; and (b) the digital wallet, if a confirmation requesting transaction on a billing detail corresponding to the identification information on the digital wallet is acquired from the payment supporting server, performing or supporting another device to perform processes of (i) displaying a confirmation requesting signal for the billing detail through a display of the user device, and (ii) transmitting, if a confirming signal of the user on the billing detail is acquired from the user device, a confirming transaction including the identification information on the digital wallet and a signature value for verification acquired by signing a value for verification with the certificate of the digital wallet to the payment supporting server, to thereby instruct the payment supporting server to (I) verify the confirming transaction, and (II) transmit amount of the billing detail to a fund source server corresponding to the digital wallet or determine an advance payment prepared for the IoT device to be used, if the confirming transaction is determined as valid, wherein the confirmation requesting transaction is generated at the payment supporting server via acquiring the identification information on the digital wallet corresponding to the identification information on the IoT device included in a billing transaction for the IoT device retrieved from the first blockchain database by referring to the link information, in response to the billing transaction which additionally includes the billing detail, a signature value for billing acquired by signing the billing detail with the certificate of the service providing device, and the identification information on the service providing device acquired from the service providing device, and wherein the confirmation requesting transaction further includes the billing detail, the identification information on the digital wallet, and the value for verification.

In accordance with still yet another aspect of the present invention, there is provided a payment supporting server for a payment for an Internet of Things (IoT) device, including: a communication part, on condition that the payment supporting server (i) has registered a certificate of the IoT device, a certificate of a service providing device, and a certificate of a digital wallet of a user in a first blockchain database, (ii) manages their corresponding first, second, and third blockchain transaction IDs, (iii) has registered a representative hash value or its processed value calculated by using (iii-1) specific hash values acquired by applying a hash function to each of the certificates and (iii-2) at least one neighboring hash value corresponding to each of the specific hash values, in a second blockchain database, (iv) manages their corresponding fourth, fifth, and sixth blockchain transaction IDs, and (v) manages link information on a link between information on the IoT device and information on the digital wallet as a payer therefor, for acquiring or supporting another device to acquire a billing transaction which refers to information on the payer from the service providing device; and a processor for performing or supporting another device to perform processes of (I) confirming validity of the billing transaction, wherein the billing transaction includes identification information on the service providing device, identification information on the IoT device, a billing detail, and a signature value for billing acquired by signing the billing detail with the certificate of the service providing device, and wherein the information on the payer includes the identification information on the IoT device, and is received from the IoT device in response to a request for the information on the payer from the service providing device, (II) acquiring identification information on the digital wallet corresponding to the identification information on the IoT device included in the billing transaction from the first blockchain database by referring to the link information, and (III) (III-1) allowing the billing detail to be paid for by using the digital wallet corresponding to the identification information on the digital wallet acquired from the first blockchain database, (III-2) registering a payment result including a payment detail corresponding to the billing detail in the first blockchain database and managing its corresponding first blockchain transaction ID of the payment result, (III-3) registering in the second blockchain database, if one of anchoring conditions for registering a hash value in the second blockchain database is satisfied, a first representative hash value or its processed value calculated by using a first specific hash value acquired by applying the hash function to the payment result and its corresponding at least one neighboring hash value, and managing its corresponding second blockchain transaction ID of the payment result, and (III-4) transmitting the payment result to at least one of the service providing device, the IoT device, and the digital wallet.

In accordance with still yet another aspect of the present invention, there is provided a service providing device for a payment for an Internet of Things (IoT) device, including: a communication part on condition that a payment supporting server (i) has registered a certificate of the IoT device, a certificate of a service providing device, and a certificate of a digital wallet of a user in a first blockchain database, (ii) manages their corresponding first, second, and third blockchain transaction IDs, (iii) has registered a representative hash value or its processed value calculated by using (iii-1) specific hash values acquired by applying a hash function to each of the certificates and (iii-2) at least one neighboring hash value corresponding to each of the specific hash values, in a second blockchain database, (iv) manages their corresponding fourth, fifth, and sixth blockchain transaction IDs, and (v) manages link information on a link between information on the IoT device and information on the digital wallet as a payer therefor, for acquiring or supporting another device to acquire payer information, including identification information on the IoT device, from the IoT device; and a processor, by referring to the acquired information on the payer, for transmitting or supporting another device to transmit a billing transaction including the identification information on the service providing device, the identification information on the IoT device, a billing detail, and a signature value for billing acquired by signing the billing detail with the certificate of the service providing device to the payment supporting server, to thereby instruct the payment supporting server to (i) acquire the identification information on the digital wallet, corresponding to the identification information on the IoT device included in the billing transaction by referring to the link information, from the first blockchain database if the billing transaction is determined as valid, (ii) transmit a payment for the billing detail by using the digital wallet corresponding to the identification information on the digital wallet acquired from the first blockchain database, and (iii) register a payment result including a payment detail corresponding to the billing detail in the first blockchain database and manage its corresponding blockchain transaction ID of the payment result, or (iv) register in the second blockchain database, if one of the anchoring conditions is satisfied, a first representative hash value or its processed value calculated by using (iv-1) a first specific hash value acquired by applying the hash function to the payment result and (iv-2) its corresponding at least one neighboring hash value, and manage its corresponding second blockchain transaction ID of the payment result, and (v) transmit the payment result to at least one of the service providing device, the IoT device, and the digital wallet.

In accordance with still yet another aspect of the present invention, there is provided a digital wallet of a user for a payment for an Internet of Things (IoT) device, including: a communication part, on condition that a payment supporting server (I) has registered a certificate of the IoT device, a certificate of a service providing device, and a certificate of the digital wallet in a first blockchain database, and manages their corresponding first, second, and third blockchain transaction IDs, and (II) has registered a representative hash value or its processed value calculated by using (II-1) specific hash values acquired by applying a hash function to each of the certificates and (II-2) at least one neighboring hash value corresponding to each of the specific hash values, in a second blockchain database, and manages their corresponding fourth, fifth, and sixth blockchain transaction IDs, for acquiring or supporting another device to acquire identification information on the IoT device from the IoT device in response to a link-connection requesting signal from a user device; and a processor for (I) displaying or supporting another device to display a confirmation requesting signal on whether a link between the IoT device and the digital wallet as a payer therefor is to be established on the user device, (II) transmitting or supporting another device to transmit, if a link-connection instructing signal on the link is acquired from the user device, a link-connection requesting transaction to the payment supporting server, wherein the link-connection requesting transaction includes identification information on the digital wallet, the identification information on the IoT device, and a signature value for identification acquired by signing the identification information on the IoT device with the certificate of the digital wallet, to thereby allow the payment supporting server to (1) verify the IoT device corresponding to the identification information on the IoT device included in the link-connection requesting transaction, (2) connect the link if the IoT device is determined as valid, (3) register link information on the link in the first blockchain database and manage its corresponding first link-info blockchain transaction ID, (4) (4-1) register in the second blockchain database, if one of the anchoring conditions is satisfied, a fourth representative hash value or its processed value calculated by using (i) a fourth specific hash value acquired by applying the hash function to the link information and (ii) its corresponding at least one neighboring hash value, (4-2) manage its corresponding second link-info blockchain transaction ID, and (4-3) transmit the link information to at least one of the IoT device and the digital wallet, and (III) performing or supporting another device to perform processes, if a confirmation requesting transaction on a billing detail corresponding to the identification information on the digital wallet is acquired from the payment supporting server, of (i) displaying a confirmation requesting signal for the billing detail through a display of the user device, and (ii) transmitting, if a confirming signal of the user on the billing detail is acquired from the user device, a confirming transaction including the identification information on the digital wallet and a signature value for verification acquired by signing a value for verification with the certificate of the digital wallet to the payment supporting server, to thereby instruct the payment supporting server to verify the confirming transaction; and transmit amount of the billing detail to a fund source server corresponding to the digital wallet or determine an advance payment prepared for the IoT device to be used, if the confirming transaction is determined as valid, wherein the confirmation requesting transaction is generated at the payment supporting server via acquiring the identification information on the digital wallet corresponding to the identification information on the IoT device included in a billing transaction for the IoT device retrieved from the first blockchain database by referring to the link information, in response to the billing transaction which additionally includes the billing detail, a signature value for billing acquired by signing the billing detail with the certificate of the service providing device, and the identification information on the service providing device acquired from the service providing device, and wherein the confirmation requesting transaction further includes the billing detail, the identification information on the digital wallet, and the value for verification.

In addition, recordable media that are readable by a computer for storing a computer program to execute the method of the present invention is further provided.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
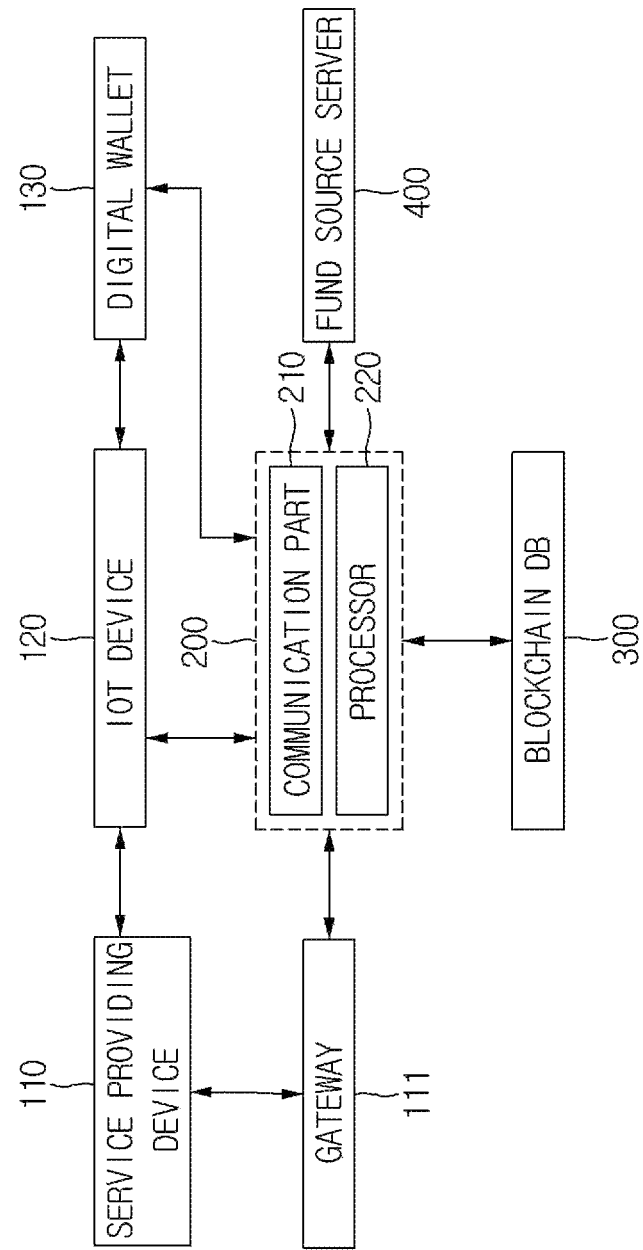
FIG. 1 is a drawing schematically illustrating a payment system for an IoT device in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views. Further, in the detailed description, terms like "first", "second", etc. are used for describing arbitrary values or data, but not for describing their orders.

To allow those skilled in the art to the present invention to be carried out easily, the example embodiments of the present invention by referring to attached diagrams will be explained in detail as shown below.

FIG. 1 is a drawing schematically illustrating a payment system for an IoT, i.e., Internet of Things, device in accordance with one example embodiment of the present invention, and the payment system may include a service providing terminal, i.e., a service providing device, 110, the IoT device 120, a digital wallet of a user 130, a payment supporting server 200, and a fund source server 400.

First, the service providing device 110 may be a biller for a cost of a rent, a use, or a purchase of a product, or a service provided to the user either on-line or off-line, and may include a computing device like a server or a terminal of a service provider. Additionally, the service providing device 110 may be a server corresponding to a bank, a product seller, or an installation. Herein, the installation may include a parking lot, a toll gate, or a movie theater, etc., but the scope of the present invention is not limited thereto, and may include any installation or equipment that the user can pay its cost and use.

Further, the IoT device 120 may be a device with IoT technology which enables various things to connect to the Internet by embedding sensors and communication functions therein, and may be a payer for a cost of services and products provided by the service provider. For example, the IoT device 120 may include a vehicle, a set-top box, an automatic meter reading, i.e., AMR, device, advanced metering infrastructure, i.e., AMI, a smart home electronics, and a user device, but the scope of the present invention is not limited thereto, and may include any device capable of connecting to the Internet using the IoT technology.

Also, the IoT device 120 may be a device corresponding to the services and the products provided by the service provider. For example, the IoT device 120 may include a device installed in a rented house or a hotel room, a rented car, but the scope of the present invention is not limited thereto, and may include any IoT device which is installed in certain space for use by the user or installed corresponding to a certain product, and which is capable of billing its user or identifying the payer.

Next, the digital wallet 130 may store information on a payment means, e.g., information on various fund sources like a credit card, a gift certificate, a membership card, a coupon, and reward points, and may enable this information to be used for payment or confirmation of related information.

Also, the digital wallet 130 may be included in the user device. Herein, the user device may receive information on the payment, and may be a mobile device for supporting the user to confirm the received information, like a mobile computer, a PDA/EDA, a mobile phone, a smart-phone and a tablet, but the scope of the present invention is not limited thereto, and may include any mobile device like a digital camera, a personal navigation device, and a mobile gaming device capable of wired and wireless communication, etc. In addition, the user device may include a communication part and a processor. The user device may include an application, i.e., app, which provides a user interface managed by the payment supporting server.

Next, the payment supporting server 200 may be comprised of multiple servers each of which performs each function related to the payment with regard to the IoT device 120. Further, the payment supporting server 200 may be the servers corresponding to or managing each node of a blockchain database 300. In addition, the payment supporting server 200 may be a transaction server which manages transactions with other devices regarding the payment for the IoT device 120.

Specifically, the payment supporting server 200 typically achieves desired system performance by using combinations of a computing device, e.g., a computer processor, a memory, a storage, an input device, an output device, and other devices that may include components of conventional computing devices; an electronic communication device such as a router or a switch; an electronic information storage system such as a network-attached storage (NAS) device and a storage area network (SAN), and computer software, i.e., instructions that allow a computing device to function in a specific way.

Next, the blockchain database 300 may store information related to the payment for the IoT device, preventing forgery and falsification by using blockchain technology, and may include a first blockchain database and a second blockchain database. Herein, the first blockchain database may be a private blockchain database, and the second blockchain database may be a private blockchain database or a public blockchain database.

The communication part 210 of such devices may transmit requests to and receive responses from other linked devices. As one example, such requests and responses may be carried out by the same TCP session, but the scope of the present invention is not limited thereto. For example, they could be transmitted and received as UDP datagrams.

The processor 220 of such devices may include hardware configuration of MPU (Micro Processing Unit) or CPU (Central Processing Unit), cache memory, data bus, etc. Additionally, OS and software configuration of applications that achieve specific purposes may be further included.

Next, the fund source server 400 may include a communication part and a processor, and may provide a service of using a fund source of the digital wallet 130, i.e., paying by the fund source, corresponding to the payment for the IoT device 120. Next, the fund source server 400 may include a credit card company server, a bank server, a payment-by-point server, and a payment-by-gift-certificate server, but the scope of the present invention is not limited thereto, and may include any server performing payment using the fund source registered in the digital wallet 130, and may be comprised of multiple servers corresponding to the fund source.

Specifically, the fund source server 400 typically achieves desired system performance by using combinations of a computing device, e.g., a computer processor, a memory, a storage, an input device, an output device, and other devices that may include components of conventional computing devices; an electronic communication device such as a router or a switch; an electronic information storage system such as a network-attached storage (NAS) device and a storage area network (SAN), and computer software, i.e., instructions that allow a computing device to function in a specific way.

Also, the fund source server may further include a gateway 111 performing data transmission between the payment supporting server 200 and the service providing device 110.

A method of paying a cost generated at the IoT device using a system configured as such in accordance with one example embodiment of the present invention is described as follows.

Figure 2:
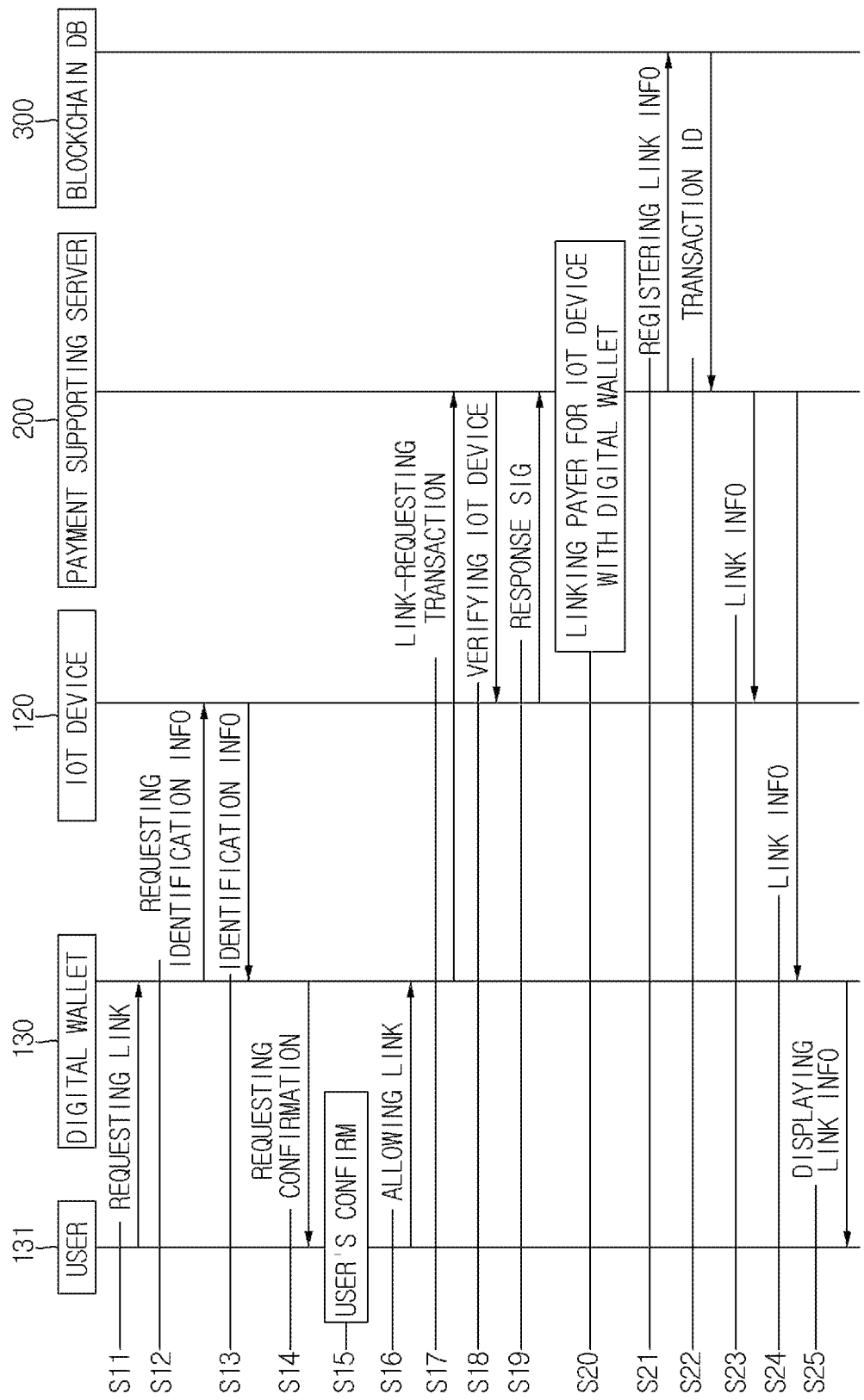
FIG. 2 is a drawing schematically illustrating a process of connecting a link between the IoT device and a digital wallet of a user as a payer therefor in accordance with one example embodiment of the present invention.

First, by referring to FIG. 2, a process of connecting a link between the IoT device and the digital wallet as the payer therefor, in accordance with one example embodiment of the present invention is described.

If the user inputs a link-connection requesting signal using the user terminal 131 to connect the link between the IoT device 120 and the digital wallet 130 as the payer therefor, i.e., to set the digital wallet as the payer for the IoT device, at a step of S11, the digital wallet 130 may transmit or support another device to transmit a request for identification information on the IoT device to the IoT device 120 with which the user requested the link at a step of S12. Herein, the transmitted request from the digital wallet 130 to the IoT device 120 may include the identification information on the digital wallet. Further, the identification information on the digital wallet may be information unique to each digital wallet for its identification, and may include at least one of a token ID of the digital wallet and a certificate of the digital wallet. Also, the identification information on the digital wallet may include at least one of an ID of the user, an ID of the user device, an IP address of the user device, a MAC address of the user device, and a phone number. The certificate of the digital wallet may include at least one of a PKI certificate, a PKI digital identity, and a public key of a key pair comprised of a private key and the public key, and may be pre-registered in the blockchain database 300.

Then, in response to the received signal requesting the identification information, the IoT device 120 may transmit or support another device to transmit the identification information on the IoT device to the digital wallet 130, at a step of S13. Herein, the IoT device 120 may confirm the digital wallet by referring to the identification information included in the received signal, and may transmit the identification information on the IoT device to the confirmed digital wallet 130. Further, the identification information on the IoT device may be information unique to each IoT device 120 for its identification, and may include at least one of a token ID of the IoT device and a certificate of the IoT device. Also, the identification information on the IoT device may include at least one of an ID of the IoT device, an IP address of the IoT device, and a MAC address of the IoT device. The certificate of the IoT device may include at least one of a PKI certificate, a PKI digital identity, and a public key of a key pair comprised of a private key and the public key, and may be pre-registered in the blockchain database 300. Further, the certificate of the IoT device may be registered at the time of its manufacture, or may be created by the user and the like to be registered in the IoT device.

Also, the digital wallet 130 may display or support another device to display through the user device 131 a confirmation requesting signal for the link that sets the digital wallet 130 as the payer for the IoT device 120, at a step of S14.

Herein, if the user wants to allow the link, the user may input information for confirming to thereby allow the link, at a step of S15. Herein, the inputted information for confirming may be information to access the certificate and the like, and may include at least one of a password, a PIN code, fingerprint information of the user, and biometric information of the user. Meanwhile, input of the information for confirming may be omitted as the case may be.

Then, the user device 131 may determine or support another device to determine whether the inputted information for confirming is identical to predetermined information for confirming, and if they are determined as identical, may transmit or support another device to transmit a link-connection instructing signal to the digital wallet 130, at a step of S16.

Then, the digital wallet 130 may transmit or support another device to transmit a link-connection requesting transaction of the IoT device to the payment supporting server 200, at a step of S17. Herein, the link-connection requesting transaction may include the identification information on the digital wallet, the identification information on the IoT device, and a signature value for identification acquired by signing the identification information on the IoT device with the certificate of the digital wallet.

Meanwhile, the digital wallet 130 is described above as a device separate from the user device 131, however, the digital wallet 130 may be included in the user device 131. For example, the digital wallet 130 may be a mobile digital wallet installed in the user device 131, and the processes above may be performed by the user device 131. Herein, the certificate of the digital wallet may be a certificate of the user stored in the user device.

If the link-connection requesting transaction is received from the digital wallet 130, the payment supporting server 200 may verify or support another device to verify the IoT device 120 corresponding to the identification information on the IoT device 120 included in the link-connection requesting transaction.

For example, the payment supporting server 200 may transmit or support another device to transmit a verifying transaction including the identification information on the IoT device and a value for verification to the IoT device 120 corresponding to the identification information on the IoT device included in the link-connection requesting transaction, at a step of S18. Herein, the value for verification may include a nonce, an OTP, and a time-stamp, etc., and may be used for verifying the IoT device. Further, the IoT device 120 may transmit or support another device to transmit a response signal including a signature value acquired by signing the value for verification included in the verifying transaction with the certificate of the IoT device, and the identification information on the IoT device to the payment supporting server 200, at a step of S19.

Then, the payment supporting server 200 may perform or support another device to perform processes of (i) acquiring the identification information on the IoT device in the response signal from the IoT device 120, (ii) acquiring the certificate of the IoT device from the blockchain database 300 registered to be corresponding to the identification information on the IoT device, and (iii) acquiring the value for verification from the signature value in the response signal by using the certificate of the IoT device obtained from the blockchain database 300. Next, the payment supporting server 200 may determine or support another device to determine if the value for verification acquired from the signature value in the response signal is identical to the value for verification transmitted to the IoT device 120 via the verifying transaction, and if the values for verification are determined as identical, may determine or support another device to determine the IoT device 120 as valid.

Herein, a process of the payment supporting server 200 acquiring the certificate of the IoT device 120 if the blockchain database 300 is comprised of the first blockchain database and the second blockchain database is described in detail as follows.

On condition that the certificate of the IoT device has been registered in the first blockchain database and its corresponding first blockchain transaction ID is managed, and that a seventh representative hash value or its processed value calculated by using (I) a seventh specific hash value acquired by applying the hash function to the certificate of the IoT device and (II) at least one neighboring hash value corresponding to the seventh specific hash value, has been registered in the second blockchain database and that its corresponding fourth blockchain transaction ID is managed, the payment supporting server 200 may perform or support another device to perform processes of (i) retrieving the certificate of the IoT device registered in the first blockchain database using the first blockchain transaction ID corresponding to the identification information on the IoT device in the response signal obtained from the IoT device 120, or (ii) retrieving the certificate of the IoT device registered in the first blockchain database by referring to information on a Merkle tree and information on its leaf nodes, wherein the information on the Merkle tree and its leaf nodes is acquired from the first blockchain database registered to be corresponding to the seventh representative hash value or its processed value included in a data message which is acquired from the second blockchain database using the fourth blockchain transaction ID corresponding to the identification information on the IoT device in the response signal.

Further, the payment supporting server 200 may confirm or support another device to confirm a validity of the link-connection requesting transaction acquired from the digital wallet 130. Herein, the payment supporting server 200 may acquire or support another device to acquire the certificate of the digital wallet in the blockchain database 300 registered to be corresponding to the identification information on the digital wallet in the link-connection requesting transaction, and may acquire or support another device to acquire the identification information on the IoT device from the signature value for identification in the link-connection requesting transaction using the certificate of the digital wallet obtained from the blockchain database 300. Also, the payment supporting server 200 may determine or support another device to determine if the identification information on the IoT device acquired from the signature value for identification is identical to the identification information on the IoT device in the link-connection requesting transaction, and if two pieces of the identification information are determined as identical, may determine or support another device to determine the link-connection requesting transaction as valid.

Herein, a process of the payment supporting server 200 acquiring the certificate of the digital wallet if the blockchain database 300 is comprised of the first blockchain database and the second blockchain database is described in detail as follows.

On condition that the certificate of the digital wallet has been registered in the first blockchain database and its corresponding third blockchain transaction ID is managed, and that a second representative hash value or its processed value calculated by using (I) a second specific hash value acquired by applying the hash function to the certificate of the digital wallet and (II) at least one neighboring hash value corresponding to the second specific hash value, has been registered in the second blockchain database and that its corresponding sixth blockchain transaction ID is managed, the payment supporting server 200 may perform or support another device to perform processes of (i) retrieving the certificate of the digital wallet registered in the first blockchain database using the third blockchain transaction ID corresponding to the identification information on the digital wallet in the link-connection requesting transaction obtained from the digital wallet 130, or (ii) retrieving the certificate of the digital wallet registered in the first blockchain database by referring to information on a Merkle tree and information on its leaf nodes, wherein the information on the Merkle tree and its leaf nodes is acquired from the first blockchain database registered to be corresponding to the second representative hash value or its processed value included in a data message which is acquired from the second blockchain database using the sixth blockchain transaction ID corresponding to the identification information on the digital wallet in the link-connection requesting transaction.

Thereafter, if the IoT device 120 is determined as valid, the payment supporting server 200 may perform or support another device to perform processes of connecting the link at a step of S20, registering link information on the link in the blockchain database 300 at a step of S21, managing its corresponding transaction ID at a step of S22, and transmitting the link information to at least one of the IoT device 120 and the digital wallet 130 at steps of S23 and S24. Further, the digital wallet 130 may store or support another device to store the identification information on the link-connected IoT device, and may display or support another device to display the link information to the user device 131 to thereby allow the user to confirm the link information at a step of S25.

Herein, a process of the payment supporting server 200 registering the link information in the first blockchain database and the second blockchain database if the blockchain database 300 is comprised of the first blockchain database and the second blockchain database is described in detail as follows.

The payment supporting server 200 may register or support another device to register the link information in the first blockchain database, and may acquire or support another device to acquire a first blockchain transaction ID of the link information representing a location of the link information registered in the first blockchain database from the first blockchain database.

Next, if one of anchoring conditions for registering a hash value in the second blockchain database is satisfied, the payment supporting server 200 may generate or support another device to generate a fourth representative hash value or its processed value, which is a Merkle root, calculated by using (i) a fourth specific hash value acquired by applying the hash function to the link information, and (ii) at least one neighboring hash value corresponding to the fourth specific hash value.

Also, the payment supporting server 200 may register or support another device to register the fourth representative hash value or its processed value in the second blockchain database, and may acquire or support another device to acquire a second blockchain transaction ID representing a location of the fourth representative hash value or its processed value registered in the second blockchain database from the second blockchain database.

Herein, the payment supporting server 200 may perform or support another device to perform processes of storing and managing the fourth specific hash value and its corresponding at least one neighboring hash value in a certain data structure. Herein, the data structure may vary and one example may be a Merkle tree.

In other words, the payment supporting server 200 may create or support another device to create a Merkle tree whose specific leaf node has the fourth specific hash value, and if one of the anchoring conditions is satisfied, the payment supporting server 200 may register or support another device to register the fourth representative hash value or its processed value in the second blockchain database, where the fourth representative hash value is calculated by using the fourth specific hash value and at least one hash value of at least one neighboring node which corresponds to the node of the fourth specific hash value.

More specifically, (x1) the payment supporting server 200 may calculate or support another device to calculate an intermediate value by using (i) the fourth specific hash value and (ii) a hash value allocated to a sibling node of a specific leaf node where the fourth specific hash value is allocated, and may allocate or support another device to allocate a hash value of the intermediate value to a parent node of the specific leaf node. (x2) If the parent node is a root node of the Merkle tree, the hash value allocated to the parent node becomes the fourth representative hash value. (x3) If the parent node is not the root node, the payment supporting server 200 may repeat the processes from (x1) to (x3) by regarding the hash value allocated to the parent node as the fourth specific hash value and regarding the parent node as the specific leaf node.

The payment supporting server 200 may register or support another device to register the hash value allocated to the root node as the fourth representative hash value in the second blockchain database. Herein, a processed value of the fourth representative hash value may be registered. For example, a value from hex operation on the fourth representative hash value may be registered.

On the other hand, if the payment supporting server 200 stores the fourth specific hash value and the at least one neighboring hash value in a 4-1st data structure and then stores and manages a 4-2nd data structure identical in a form to the 4-1st data structure, the 4-1st data structure and the 4-2nd data structure may be connected in a form of a chain.

Especially, as aforementioned, if the 4-1st data structure and the 4-2nd data structure are Merkle trees, a root value of the 4-1st data structure or a hash value of the root value may be allocated to a first leaf node of the 4-2nd data structure.

Moreover, data integrity may be further ensured by verifying the 4-1st data structure when the 4-2nd data structure is created. The verification of the 4-2nd data structure will be explained later.

Further, in case of a first Merkle tree among at least two Merkle trees connected in a form of a chain, a hash value of a certain message data comprised of text, number or symbol, or a processed value of the hash value may be allocated to a first leaf node of the first Merkle tree. For example, at the time of creation of a Merkle tree, a hash value of an input message firstly given by the payment supporting server 200 may be allocated.

Figure 3:
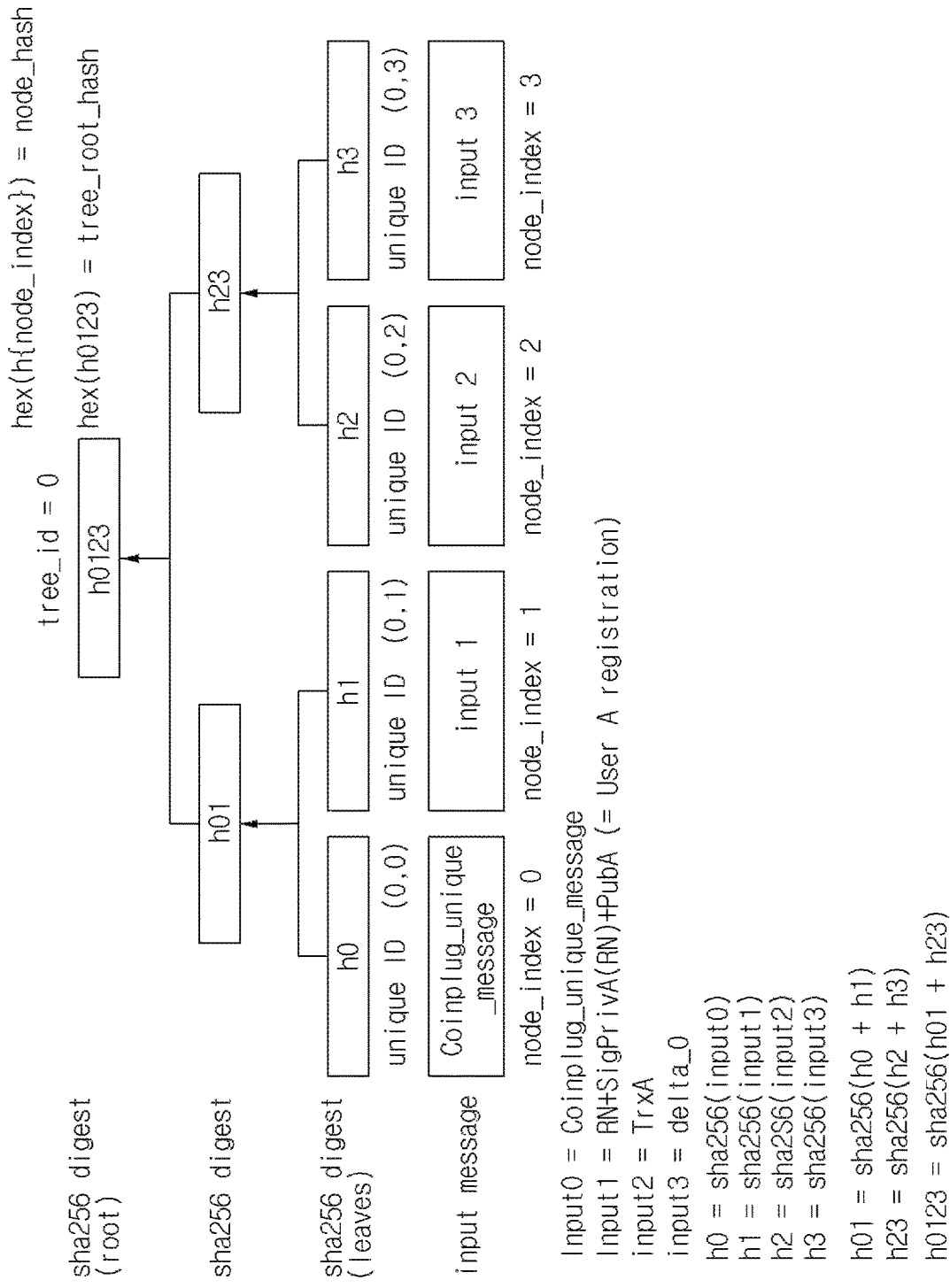
FIGS. 3 and 4 are drawings schematically illustrating a process of registering transactions related to payments for the IoT device in a blockchain database in accordance with one example embodiment of the present invention.
Figure 4:
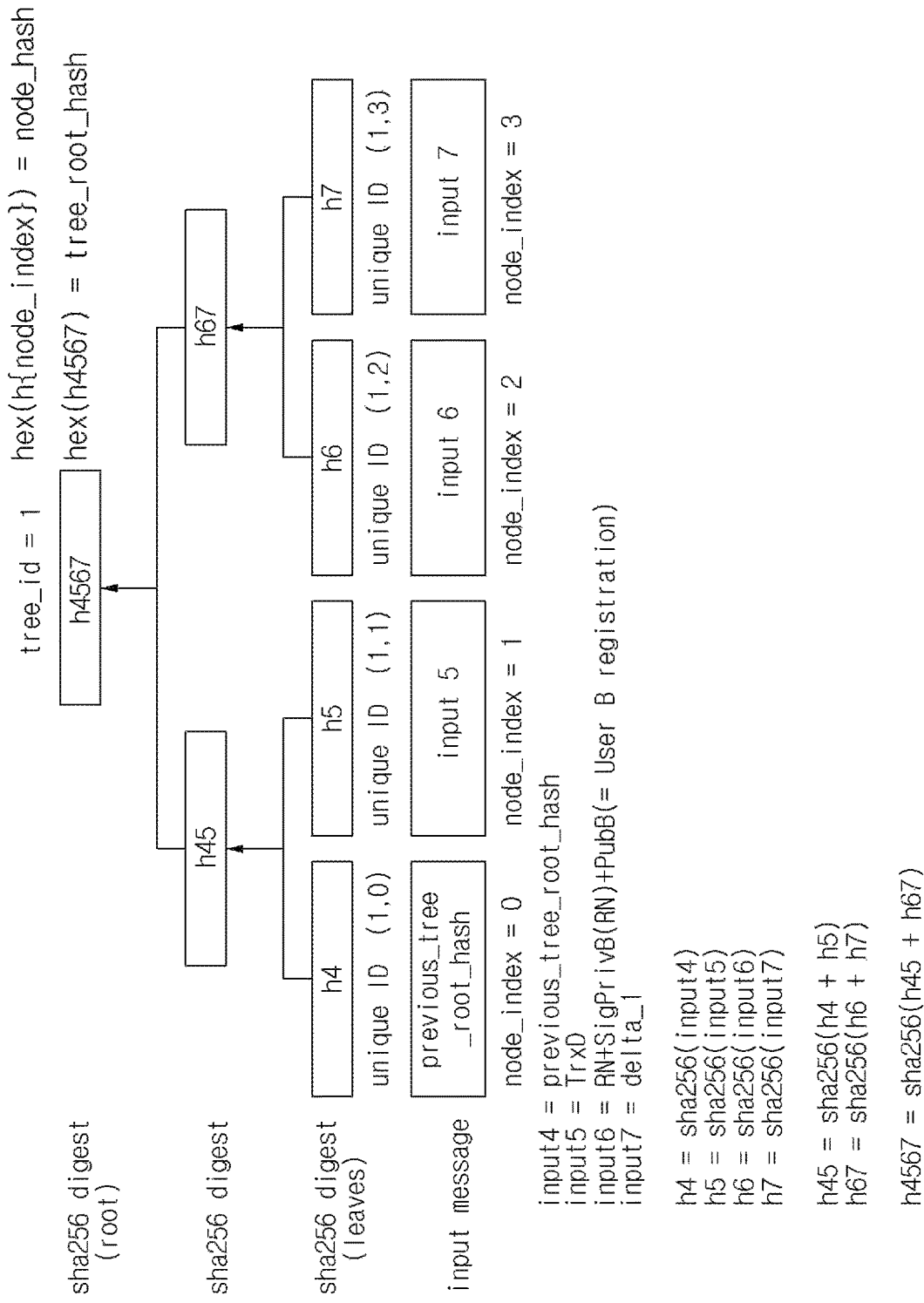

FIGS. 3 and 4 are drawings illustrating examples of Merkle trees created in accordance with one example embodiment of the present invention.

FIG. 3 illustrates a Merkle tree with four leaf nodes. As the illustrated Merkle tree is a first Merkle tree whose tree_id is zero, a hash value sha256(coinplug_unique_message) of a certain message data is allocated to an h0 node which is a first leaf node. If there is a request for registration of a transaction related to the link information, the payment supporting server 200 may create or support another device to create a leaf node next to a last leaf node of the Merkle tree currently configured and may allocate or support another device to allocate the fourth specific hash value or its processed value to the created leaf node. For example, if an allocation of values is completed with an h1 node as a last which is a second leaf node of the Merkle tree in FIG. 3, and if a new leaf node is to be created, then an h2 node which is a next leaf node may be created and the fourth specific hash value or its processed value sha256(input2) may be allocated to the h2 node. Further, the payment supporting server 200 may calculate or support another device to calculate by using (i) the fourth specific hash value allocated to the h2 node and (ii) a hash value allocated to an h3 node which is a sibling node of the h2 node. The hash value of the calculated value may be allocated to an h23 node which is a parent node of the h2 node and the h3 node. As the parent node, i.e., the h23 node, is not the root node of the Merkle tree, the payment supporting server 200 may repeat the process by regarding the hash value allocated to the h23 node as the fourth specific hash value. In other words, with the hash value allocated to the h23 node as the fourth specific hash value, the hash values allocated to the h23 node and an h01 node may be used together for calculation and allocated to an h0123 node which is a parent node of the h23 node and the h01 node. Herein, as the h0123 node is the root node, the payment supporting server 200 may register or support another device to register the processed value hex (h{node_index}) of the hash value allocated to the h0123 node in the second blockchain database.

Meanwhile, the anchoring conditions may include at least one of (i) a condition that a certain number of the transactions related to the link information are generated, (ii) a condition that a certain amount of time is elapsed, (iii) a condition that a block is created in the first blockchain database, and (iv) a condition that has at least one of characteristics of services.

On the other hand, for example, if the number of the transactions related to the link information equals the number of leaf nodes in a Merkle tree to be created and if these transactions are acquired, the payment supporting server may create or support another device to create the Merkle tree and may register or support another device to register the root value of the Merkle tree in the second blockchain database.

Also, the payment supporting server 200 may create or support another device to create a root value of the Merkle tree aforementioned at stated intervals, by referring to the condition (ii) above. In this case, the payment supporting server 200, if a certain amount of time is elapsed, may create or support another device to create a Merkle tree by referring to input values by the time, and may register or support another device to register the root value of the Merkle tree in the second blockchain database.

However, in this case, a value may not be allocated to a sibling node of the node to which the fourth specific hash value is allocated even though a certain amount of time is elapsed. In case no hash value is allocated to the sibling node even though one of the anchoring conditions is met, the payment supporting server 200 may allocate or support another device to allocate a certain hash value to the sibling node to thereby produce a root value of the Merkle tree by the method aforementioned. For example, the payment supporting server 200 may copy and allocate or support another device to allocate the fourth specific hash value to the sibling node.

The characteristics of services may be at least part of (i) information on a cost provided by an issuer of the transaction related to the link information, (ii) information on a time-zone during which a registration of the transaction related to the link information is performed, (iii) information on a location where the registration service of the transaction is performed and (iv) information on a type of a company that requested the registration of the transaction. However, the scope of the present invention is not limited thereto.

Meanwhile, if a creation of a new Merkle tree starts and if one of the anchoring conditions is satisfied without the transaction related to the link information, the payment supporting server 200 may create or support another device to create the new Merkle tree by allotting certain message data to its first and second leaf nodes and may register or support another device to register the root value of the new Merkle tree or its processed value in the second blockchain database. In this case, the new Merkle tree with two leaf nodes may be created.

Further, as aforementioned, if the payment supporting server 200 stores the fourth specific hash value and the at least one neighboring hash value in the 4-1st data structure and then stores and manages the 4-2nd data structure identical in a form to the 4-1st data structure, the 4-1st data structure and the 4-2nd data structure may be connected in a form of a chain. Especially, if the 4-1st data structure and the 4-2nd data structure are Merkle trees, a root value of the 4-1st data structure or a hash value of the root value may be allocated to a first leaf node of the 4-2nd data structure.

FIG. 4 is a drawing illustrating an example of a Merkle tree created in a form of the 4-2nd data structure in accordance with one example embodiment of the present invention.

By referring to FIG. 4, it is clear that the root value hex(h0123) of the Merkle tree whose tree_id is zero in FIG. 3 is allocated as sha256(input4) to the first leaf node which is an h4 node of a new Merkle tree. In such a manner, the present invention has advantage of improving data integrity, as tracking becomes easier even in the case of data forgery, by connecting multiple data structures created when a transaction occurs.

Figure 5:
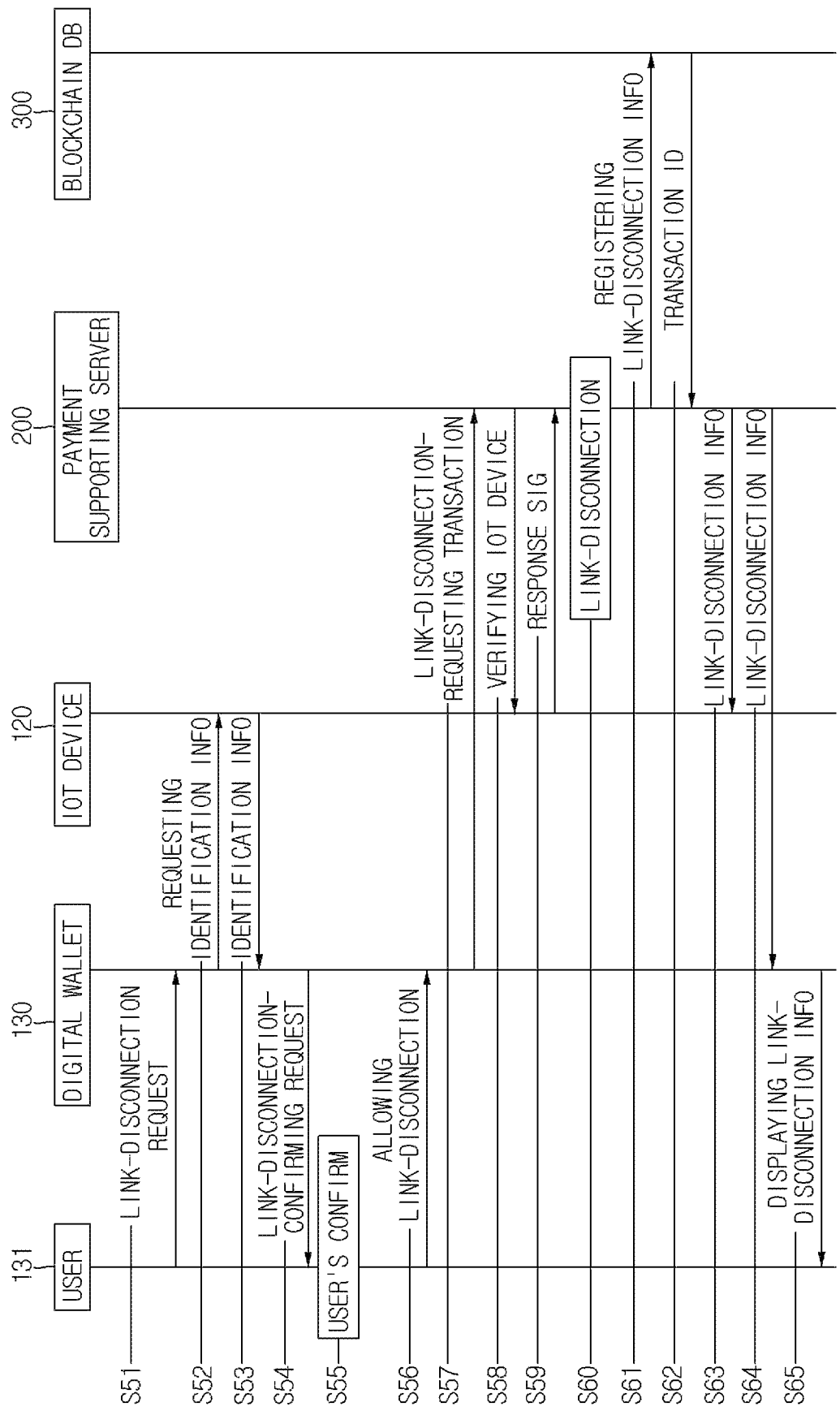
FIG. 5 is a drawing schematically illustrating a process of disconnecting the link in accordance with one example embodiment of the present invention.

Next, by referring to FIG. 5, a process of disconnecting the link between the IoT device and the digital wallet as the payer therefor in accordance with one example embodiment of the present invention is described.

If the user selects the identification information on the IoT device linked with the digital wallet and inputs a link-disconnection requesting signal using the user terminal 131 to disconnect the digital wallet 130 from the payer for the IoT device 120 at a step of S51, the digital wallet 130 may transmit or support another device to transmit a request for the identification information on the IoT device to the IoT device 120 from which the user requested disconnection, at a step of S52. Herein, the request transmitted from the digital wallet 130 to the IoT device 120 may include the identification information on the digital wallet. Further, the identification information on the digital wallet may be information unique to each digital wallet for its identification, and may include at least one of a token ID of the digital wallet and the certificate of the digital wallet. Also, the identification information on the digital wallet may include at least one of an ID of the user, an ID of the user device, an IP address of the user device, a MAC address of the user device, and a phone number. The certificate of the digital wallet may include at least one of a PKI certificate, a PKI digital identity, and a public key of a key pair comprised of a private key and the public key, and may be pre-registered in the blockchain database 300.

Then, in response to the received signal requesting the identification information, the IoT device 120 may transmit or support another device to transmit the identification information on the IoT device to the digital wallet 130, at a step of S53. Herein, the IoT device 120 may confirm or support another device to confirm the digital wallet that requested the identification information by using the identification information included in the received signal, and may transmit or support another device to transmit the identification information on the IoT device to the confirmed digital wallet 130. Further, the identification information on the IoT device may be information unique to each IoT device 120 for its identification, and may include at least one of a token ID of the IoT device and the certificate of the IoT device. Also, the identification information on the IoT device may include at least one of an ID of the IoT device, an IP address of the IoT device, and a MAC address of the IoT device. The certificate of the IoT device may include at least one of a PKI certificate, a PKI digital identity, and a public key of a key pair comprised of a private key and the public key, and may be pre-registered in the blockchain database 300. Further, the certificate of the IoT device may be registered at the time of its manufacture, or may be created by the user and the like to be registered in the IoT device.

The digital wallet 130 may display or support another device to display through the user device 131 a confirmation requesting signal for disconnecting the link between the IoT device 120 and the digital wallet 130 as the payer therefor, at a step of S54.

Herein, if the user wants to disconnect the link, the user may input information for confirming at a step of S55. Herein, the inputted information for confirming may be information to access the certificate and the like, and may include at least one of a password, a PIN code, fingerprint information of the user, and biometric information of the user. Meanwhile, input of the information for confirming may be omitted as the case may be.

Then, the user device 131 may determine or support another device to determine whether the inputted information for confirming is identical to predetermined information for confirming, and if they are determined as identical, may transmit or support another device to transmit a link-disconnection instructing signal to the digital wallet 130, at a step of S56.

Then, the digital wallet 130 may transmit or support another device to transmit a link-disconnection requesting transaction to the payment supporting server 200, at a step of S57. Herein, the link-disconnection requesting transaction may include the identification information on the digital wallet, the identification information on the IoT device, and the signature value for identification acquired by signing the identification information on the IoT device with the certificate of the digital wallet.

Meanwhile, the digital wallet 130 is described above as a device separate from the user device 131, however, the digital wallet 130 may be included in the user device 131. For example, the digital wallet 130 may be a mobile digital wallet installed in the user device 131, and the processes above may be performed by the user device 131. Herein, the certificate of the digital wallet may be the certificate of the user stored in the user device.

If the link-disconnection requesting transaction is received from the digital wallet 130, the payment supporting server 200 may verify or support another device to verify the IoT device 120 corresponding to the identification information on the IoT device 120 included in the link-disconnection requesting transaction.

For example, the payment supporting server 200 may transmit or support another device to transmit a verifying transaction including the identification information on the IoT device and a value for verification to the IoT device 120 corresponding to the identification information on the IoT device included in the link-disconnection requesting transaction, at a step of S58. Herein, the value for verification may include a nonce, an OTP, and a time-stamp, etc. Further, the IoT device 120 may transmit or support another device to transmit a response signal including a signature value acquired by signing the value for verification included in the verifying transaction with the certificate of the IoT device, and the identification information on the IoT device to the payment supporting server 200, at a step of S59.

Then, the payment supporting server 200 may perform or support another device to perform processes of (i) acquiring the identification information on the IoT device in the response signal, (ii) acquiring the certificate of the IoT device from the blockchain database 300 registered to be corresponding to the identification information on the IoT device, and (iii) acquiring the value for verification from the signature value in the response signal by using the certificate of the IoT device obtained from the blockchain database 300. Next, the payment supporting server 200 may determine if the value for verification acquired from the signature value in the response signal is identical to the value for verification transmitted to the IoT device 120 via the verifying transaction, and if they are determined as identical, may determine the IoT device 120 as valid.

Herein, a process of the payment supporting server 200 acquiring the certificate of the IoT device 120 if the blockchain database 300 is comprised of the first blockchain database and the second blockchain database is described in detail as follows.

On condition that the certificate of the IoT device has been registered in the first blockchain database and its corresponding first blockchain transaction ID is managed, and that the seventh representative hash value or its processed value calculated by using (I) the seventh specific hash value acquired by applying the hash function to the certificate of the IoT device and (II) at least one neighboring hash value corresponding to the seventh specific hash value, has been registered in the second blockchain database and that its corresponding fourth blockchain transaction ID is managed, the payment supporting server 200 may (i) retrieve the certificate of the IoT device registered in the first blockchain database using the first blockchain transaction ID corresponding to the identification information on the IoT device in the response signal obtained from the IoT device 120, or (ii) retrieve the certificate of the IoT device registered in the first blockchain database by referring to information on a Merkle tree and information on its leaf nodes, wherein the information on the Merkle tree and its leaf nodes is acquired from the first blockchain database registered to be corresponding to the seventh representative hash value or its processed value in a data message which is acquired from the second blockchain database using the fourth blockchain transaction ID corresponding to the identification information on the IoT device in the response signal.

Further, the payment supporting server 200 may confirm validity of the link-disconnection requesting transaction acquired from the digital wallet 130. Herein, the payment supporting server 200 may acquire the certificate of the digital wallet in the blockchain database 300 registered to be corresponding to the identification information on the digital wallet in the link-disconnection requesting transaction, and may acquire the identification information on the IoT device from the signature value for identification in the link-disconnection requesting transaction using the certificate of the digital wallet obtained from the blockchain database 300. Also, the payment supporting server 200 may determine if the identification information on the IoT device acquired from the signature value for identification is identical to the identification information on the IoT device in the link-disconnection requesting transaction, and if they are determined as identical, may determine the link-disconnection requesting transaction as valid.

Herein, a process of the payment supporting server 200 acquiring the certificate of the digital wallet if the blockchain database 300 is comprised of the first blockchain database and the second blockchain database is described in detail as follows.

On condition that the certificate of the digital wallet has been registered in the first blockchain database and its corresponding third blockchain transaction ID is managed, and that the second representative hash value or its processed value calculated by using (I) the second specific hash value acquired by applying the hash function to the certificate of the digital wallet and (II) at least one neighboring hash value corresponding to the second specific hash value, has been registered in the second blockchain database and that its corresponding sixth blockchain transaction ID is managed, the payment supporting server 200 may (i) retrieve the certificate of the digital wallet registered in the first blockchain database using the third blockchain transaction ID corresponding to the identification information on the digital wallet in the link-disconnection requesting transaction obtained from the digital wallet 130, or (ii) retrieve the certificate of the digital wallet registered in the first blockchain database by referring to information on a Merkle tree and information on its leaf nodes, wherein the information on a Merkle tree and its leaf nodes is acquired from the first blockchain database registered to be corresponding to the second representative hash value or its processed value included in a data message which is acquired from the second blockchain database using the sixth blockchain transaction ID corresponding to the identification information on the digital wallet in the link-disconnection requesting transaction.

Thereafter, if the IoT device 120 is determined as valid, the payment supporting server 200 may disconnect the link at a step of S60, may register information on the disconnection in the blockchain database 300 at a step of S61, may manage its corresponding transaction ID at a step of S62, and may transmit or support another device to transmit the information on the disconnection to at least one of the IoT device 120 and the digital wallet 130 at steps of S63 and S64. Further, the digital wallet 130 may display the information on the disconnection to the user device 131 to thereby allow the user to confirm the information on the disconnection at a step of S65.

Herein, a process of the payment supporting server 200 registering the information on the disconnection in the first blockchain database and the second blockchain database if the blockchain database 300 is comprised of the first blockchain database and the second blockchain database is described in detail as follows.

The payment supporting server 200 may register or support another device to register the information on the disconnection in the first blockchain database, and may acquire or support another device to acquire a first blockchain transaction ID of the information on the disconnection representing a location of the information on the disconnection registered in the first blockchain database from the first blockchain database.

Next, if one of the anchoring conditions for registering a hash value in the second blockchain database is satisfied, the payment supporting server 200 may generate a fifth representative hash value or its processed value, which is a Merkle root, calculated by using (i) a fifth specific hash value acquired by applying the hash function to the information on the disconnection, and (ii) at least one neighboring hash value corresponding to the fifth specific hash value.

Also, the payment supporting server 200 may register or support another device to register the fifth representative hash value or its processed value in the second blockchain database, and may acquire or support another device to acquire a second blockchain transaction ID representing a location of the fifth representative hash value or its processed value registered in the second blockchain database from the second blockchain database.

Herein, the payment supporting server 200 may store and manage the fifth specific hash value and its corresponding at least one neighboring hash value in a certain data structure. Herein, the data structure may vary and one example may be a Merkle tree.

In other words, the payment supporting server 200 may create or support another device to create a Merkle tree whose specific leaf node has the fifth specific hash value, and if said one of the anchoring conditions is satisfied, the payment supporting server 200 may register or support another device to register the fifth representative hash value or its processed value in the second blockchain database, where the fifth representative hash value is calculated by using the fifth specific hash value and at least one hash value of at least one neighboring node which corresponds to the node of the fifth specific hash value.

More specifically, (x1) the payment supporting server 200 may calculate or support another device to calculate an intermediate value by using (i) the fifth specific hash value and (ii) a hash value allocated to a sibling node of a specific leaf node where the fifth specific hash value is allocated, and may allocate or support another device to allocate a hash value of the intermediate value to a parent node of the specific leaf node. (x2) If the parent node is a root node of the Merkle tree, the hash value allocated to the parent node becomes the fifth representative hash value. (x3) If the parent node is not the root node, the payment supporting server 200 may repeat the processes from (x1) to (x3) by regarding the hash value allocated to the parent node as the fifth specific hash value and regarding the parent node as the specific leaf node.

The payment supporting server 200 may register or support another device to register the hash value allocated to the root node as the fifth representative hash value in the second blockchain database. Herein, a processed value of the fifth representative hash value may be registered. For example, a value from hex operation on the fifth representative hash value may be registered.

On the other hand, if the payment supporting server 200 stores the fifth specific hash value and the at least one neighboring hash value in a 5-1st data structure and then stores and manages a 5-2nd data structure identical in a form to the 5-1st data structure, the 5-1st data structure and the 5-2nd data structure may be connected in a form of a chain.

Especially, as aforementioned, if the 5-1st data structure and the 5-2nd data structure are Merkle trees, a root value of the 5-1st data structure or a hash value of the root value may be allocated to a first leaf node of the 5-2nd data structure.

Moreover, data integrity may be further ensured by verifying the 5-1st data structure when the 5-2nd data structure is created.

Further, in case of a first Merkle tree among at least two Merkle trees connected in a form of a chain, a hash value of a certain message data comprised of text, number or symbol, or a processed value of the hash value may be allocated to a first leaf node of the first Merkle tree. For example, at the time of creation of a Merkle tree, a hash value of an input message firstly given by the payment supporting server 200 may be allocated.

Meanwhile, the description of FIGS. 3 and 4 explains a Merkle tree similar to that created according to the information on the disconnection, therefore detailed explanation is omitted.

Figure 6:
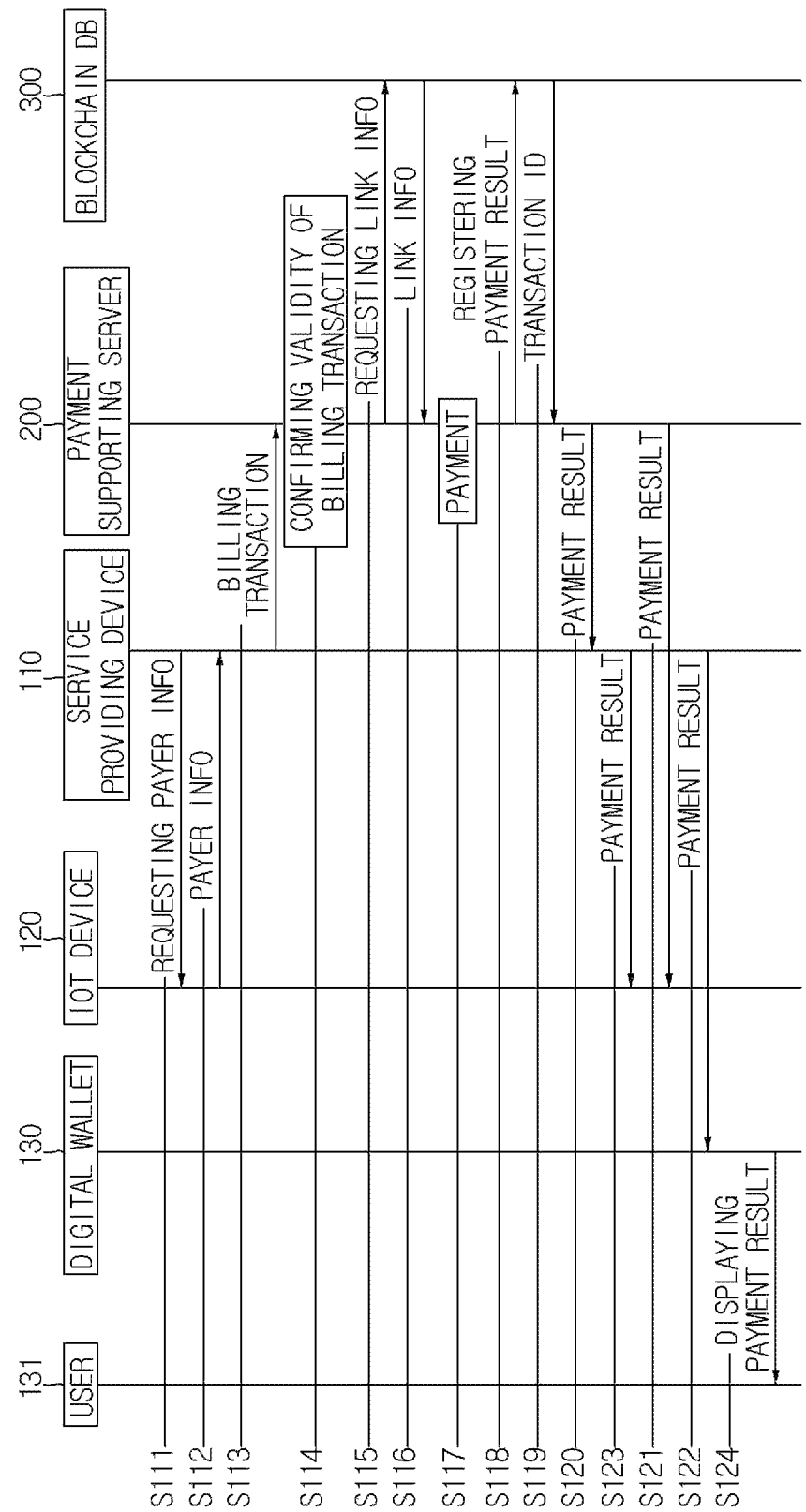
FIG. 6 is a drawing schematically illustrating a process of the payment for a cost generated at the IoT device in accordance with one example embodiment of the present invention.

Next, on condition that the digital wallet has been linked with the payer for the IoT device, a process of paying the cost generated at the IoT device in accordance with one example embodiment of the present invention is described by referring to FIG. 6.

If the service providing device 110 of the service provider transmits a request for information on the payer including the identification information on the IoT device to the IoT device 120, for billing a product or a service purchased or used via the IoT device 120 by the user at a step of S111, the IoT device 120 may transmit or support another device to transmit the identification information on the IoT device to the service providing device 110 corresponding to the identification information on the service providing device included in the request at a step of S112. Herein, the service providing device 110 may include a terminal and a server of a seller of products, as well as those that provide services to the user.

Meanwhile, the payment for the cost generated at the IoT device 120 may include payment related to products and services off-line like refueling cars, purchase of car-related products, and car-related services, payment related to usage of infrastructure using metering devices for electricity or gas, payment automatically made between devices, payment for home shopping purchase by smart devices, and payment for VODs provided by a set-top box. However, the scope of the payment for the IoT device 120 is not limited thereto, and may include payment for every cost billed for the IoT device 120 used by the user.

Next, the service providing device 110 may transmit or support another device to transmit a billing transaction by referring to the identification information on the IoT device acquired from the IoT device 120 to the payment supporting server 200 at a step of S113. Herein, the billing transaction may include the identification information on the service providing device, the identification information on the IoT device, the billing detail, and the signature value for billing acquired by signing the billing detail with the certificate of the service providing device.

Then, if the billing transaction is acquired from the service providing device 110, the payment supporting server 200 may confirm validity of the billing transaction acquired from the service providing device 110 at a step of S114.

For example, the payment supporting server 200 may (i) acquire the certificate of the service providing device from the blockchain database 300 registered to be corresponding to the identification information on the service providing device in the billing transaction, and (ii) acquire the billing detail from the signature value for billing in the billing transaction by using the certificate of the service providing device obtained from the blockchain database 300. Next, the payment supporting server 200 may determine if the billing detail acquired from the signature value for billing is identical to the billing detail in the billing transaction, and if they are determined as identical, may determine the billing transaction as valid.

Herein, a process of the payment supporting server 200 acquiring the certificate of the service providing device if the blockchain database 300 is comprised of the first blockchain database and the second blockchain database is described in detail as follows.

On condition that the certificate of the service providing device has been registered in the first blockchain database and its corresponding second blockchain transaction ID is managed, and that a sixth representative hash value or its processed value calculated by using (I) a sixth specific hash value acquired by applying the hash function to the certificate of the service providing device and (II) at least one neighboring hash value corresponding to the sixth specific hash value, has been registered in the second blockchain database and that its corresponding fifth blockchain transaction ID is managed, the payment supporting server 200 may (i) retrieve the certificate of the service providing device registered in the first blockchain database using the second blockchain transaction ID corresponding to the identification information on the service providing device in the billing transaction obtained from the service providing device 110, or (ii) retrieve the certificate of the service providing device registered in the first blockchain database by referring to information on a Merkle tree and information on its leaf nodes, wherein the information on the Merkle tree and its leaf nodes is acquired from the first blockchain database registered to be corresponding to the sixth representative hash value or its processed value included in a data message which is is acquired from the second blockchain database using the fifth blockchain transaction ID corresponding to the identification information on the service providing device in the billing transaction.

Then, if the billing transaction is determined as valid, the payment supporting server 200 may acquire the identification information on the digital wallet 130 set as the payer for the IoT device 120 by using the link information described in FIG. 2, at steps of S115 and S116.

For example, the payment supporting server 200 may transmit or support another device to transmit a request for the link information to the blockchain database 300 by referring to a transaction ID corresponding to the identification information on the IoT device in the billing transaction at a step of S115, and may acquire or support another device to acquire the link information from the blockchain database 300 at a step of S116.

Herein, a process of the payment supporting server 200 acquiring the link information if the blockchain database 300 is comprised of the first blockchain database and the second blockchain database is described in detail as follows.

On condition that the link information has been registered as described in FIG. 2, the payment supporting server 200 may (i) retrieve the link information registered in the first blockchain database using the first blockchain transaction ID corresponding to the identification information on the IoT device in the billing transaction obtained from the service providing device 110, (ii) retrieve a data message from the second blockchain database using the second blockchain transaction ID corresponding to the identification information on the IoT device in the billing transaction, (iii) retrieve information on a Merkle tree and information on its leaf nodes corresponding to the fourth representative hash value or its processed value included in the data message from the first blockchain database, and (iv) acquire the certificate of the service providing device registered in the first blockchain database referring to the retrieved information on the Merkle tree and its leaf nodes.

Then, using the identification information on the digital wallet 130 set as the payer for the IoT device 120 acquired by referring to the link information, the payment supporting server 200 may instruct a fund source registered in the digital wallet 130 to pay or support another device to pay for the IoT device at a step of S117. Herein, the payment may include a deferred payment, an advance payment, a standing order payment, and a conditional payment, etc., but the scope of the present invention is not limited thereto, and may include any payment that uses the fund source to pay a cost. Further, the payment may be made by a means configured by the user using a smart contract.

Thereafter, the payment supporting server 200 may register or support another device to register a payment result in the blockchain database 300 at a step of S118, may manage its corresponding transaction ID at a step of S119, and may transmit or support another device to transmit the payment result to at least one of the service providing device 110, the IoT device 120 and the digital wallet 130 at steps of S120, S121 and S122. Next, the service providing device 110 may transmit or support another device to transmit the payment result to the IoT device 120 at a step of S123. Further, the digital wallet 130 may display the payment result to the user device 131 to thereby allow the user to confirm the payment result at a step of S124.

Herein, a process of the payment supporting server 200 registering the payment result to the first blockchain database and the second blockchain database if the blockchain database 300 is comprised of the first blockchain database and the second blockchain database is described in detail as follows.

The payment supporting server 200 may register or support another device to register the payment result in the first blockchain database, and may acquire or support another device to acquire a first blockchain transaction ID of the payment result representing a location of the payment result registered in the first blockchain database from the first blockchain database.

Next, if one of the anchoring conditions for registering a hash value in the second blockchain database is satisfied, the payment supporting server 200 may generate the first representative hash value or its processed value, which is a Merkle root, calculated by using (i) the first specific hash value acquired by applying the hash function to the payment result, and (ii) at least one neighboring hash value corresponding to the first specific hash value.

Also, the payment supporting server 200 may register or support another device to register the first representative hash value or its processed value in the second blockchain database, and may acquire or support another device to acquire a second blockchain transaction ID representing a location of the first representative hash value or its processed value registered in the second blockchain database from the second blockchain database.

Herein, the payment supporting server 200 may store and manage the first specific hash value and its corresponding at least one neighboring hash value in a certain data structure. Herein, the data structure may vary and one example may be a Merkle tree.

In other words, the payment supporting server 200 may create or support another device to create a Merkle tree whose specific leaf node has the first specific hash value, and if said one of the anchoring conditions is satisfied, the payment supporting server 200 may register or support another device to register the first representative hash value or its processed value in the second blockchain database, where the first representative hash value is calculated by using the first specific hash value and at least one hash value of at least one neighboring node which corresponds to the node of the first specific hash value.

More specifically, (x1) the payment supporting server 200 may calculate or support another device to calculate an intermediate value by using (i) the first specific hash value and (ii) a hash value allocated to a sibling node of a specific leaf node where the first specific hash value is allocated, and may allocate or support another device to allocate a hash value of the intermediate value to a parent node of the specific leaf node. (x2) If the parent node is a root node of the Merkle tree, the hash value allocated to the parent node becomes the first representative hash value. (x3) If the parent node is not the root node, the payment supporting server 200 may repeat the processes from (x1) to (x3) by regarding the hash value allocated to the parent node as the first specific hash value and regarding the parent node as the specific leaf node.

The payment supporting server 200 may register or support another device to register the hash value allocated to the root node as the first representative hash value in the second blockchain database. Herein, a processed value of the first representative hash value may be registered. For example, a value from hex operation on the first representative hash value may be registered.

On the other hand, if the payment supporting server 200 stores the first specific hash value and the at least one neighboring hash value in a 1-1st data structure and then stores and manages a 1-2nd data structure identical in a form to the 1-1st data structure, the 1-1st data structure and the 1-2nd data structure may be connected in a form of a chain.

Especially, as aforementioned, if the 1-1st data structure and the 1-2nd data structure are Merkle trees, a root value of the 1-1st data structure or a hash value of the root value may be allocated to a first leaf node of the 1-2nd data structure.

Moreover, data integrity may be further ensured by verifying the 1-1st data structure when the 1-2nd data structure is created.

Further, in case of a first Merkle tree among at least two Merkle trees connected in a form of a chain, a hash value of a certain message data comprised of text, number or symbol, or a processed value of the hash value may be allocated to a first leaf node of the first Merkle tree. For example, at the time of creation of a Merkle tree, a hash value of an input message firstly given by the payment supporting server 200 may be allocated.

Meanwhile, the description of FIGS. 3 and 4 explains a Merkle tree similar to that created according to the payment result, therefore detailed explanation is omitted.

Figure 7:
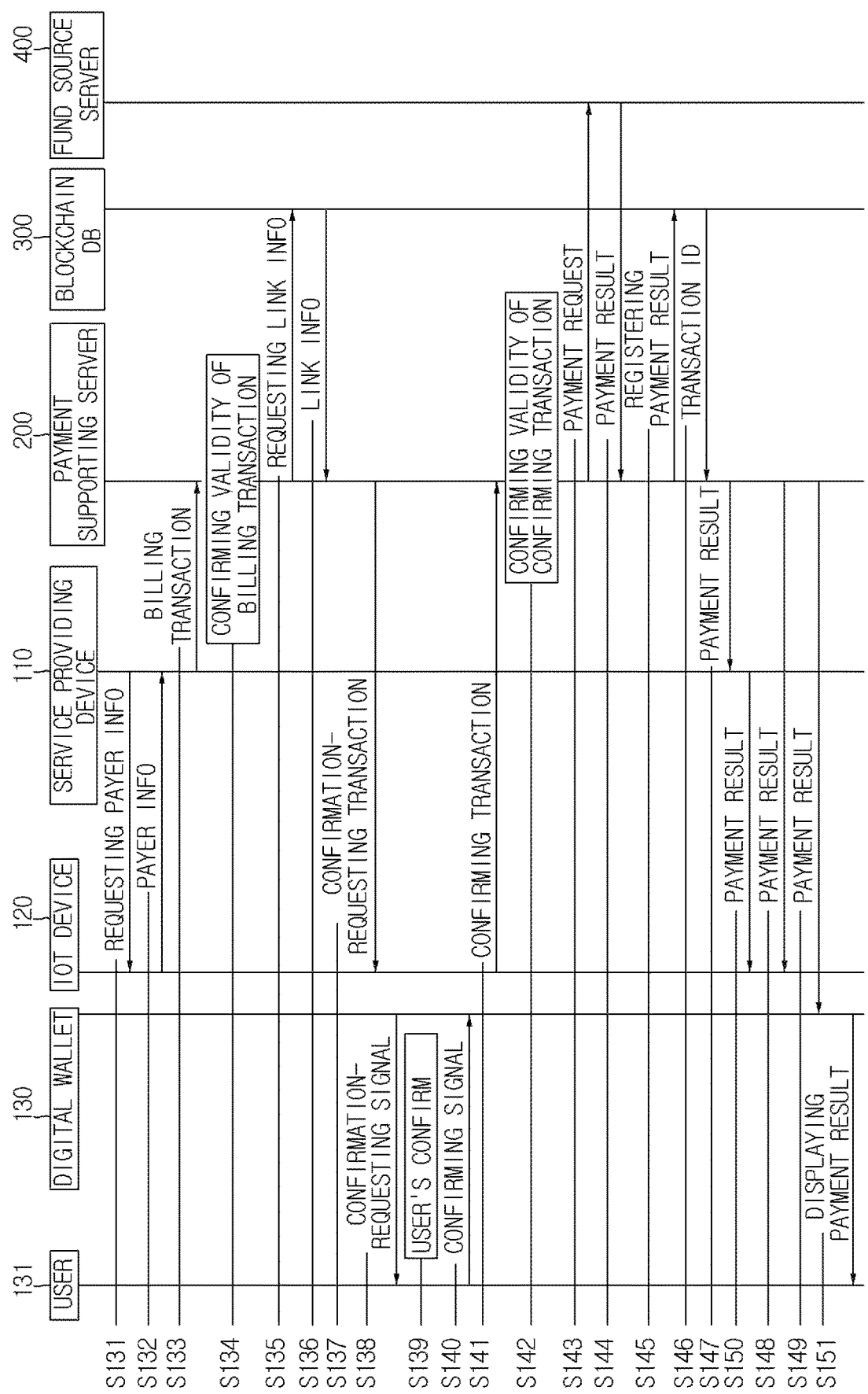
FIG. 7 is a drawing schematically illustrating a process of a deferred payment for the cost generated at the IoT device in accordance with one example embodiment of the present invention.

Next, a detailed description of a process of the advance payment for the IoT device by referring to FIG. 7 in accordance with one example embodiment of the present invention is as follows.

If the service providing device 110 of the service provider transmits a request for information on the payer including the identification information on the IoT device to the IoT device 120, for billing a product or a service purchased or used via the IoT device 120 by the user at a step of S131, the IoT device 120 may transmit or support another device to transmit the identification information on the IoT device to the service providing device 110 corresponding to the identification information on the service providing device included in the request at a step of S132. Herein, the service providing device 110 may include a terminal and a server of a seller of the products, as well as those that provide services to the user.

Meanwhile, the payment for the cost generated at the IoT device 120 may include payment related to products and services off-line like refueling cars, purchase of car-related products, and car-related services, payment related to usage of infrastructure using metering devices for electricity or gas, payment automatically made between devices, payment for home shopping purchase by smart devices, and payment for VODs provided by a set-top box. However, the scope of the payment for the IoT device 120 is not limited thereto, and may include payment for every cost billed for the IoT device 120 used by the user.

Next, the service providing device 110 may transmit or support another device to transmit the billing transaction by referring to the identification information on the IoT device acquired from the IoT device 120 to the payment supporting server 200 at a step of S133. Herein, the billing transaction may include the identification information on the service providing device, the identification information on the IoT device, the billing detail, and the signature value for billing acquired by signing the billing detail with the certificate of the service providing device.

Then, if the billing transaction is acquired from the service providing device 110, the payment supporting server 200 may confirm validity of the billing transaction acquired from the service providing device 110 at a step of S134.

For example, the payment supporting server 200 may (i) acquire the certificate of the service providing device from the blockchain database 300 registered to be corresponding to the identification information on the service providing device in the billing transaction, and (ii) acquire the billing detail from the signature value for billing in the billing transaction by using the certificate of the service providing device obtained from the blockchain database 300. Next, the payment supporting server 200 may determine if the billing detail acquired from the signature value for billing is identical to the billing detail in the billing transaction, and if they are determined as identical, may determine the billing transaction as valid.

Herein, a process of the payment supporting server 200 acquiring the certificate of the service providing device if the blockchain database 300 is comprised of the first blockchain database and the second blockchain database is described in detail as follows.

On condition that the certificate of the service providing device has been registered in the first blockchain database and its corresponding second blockchain transaction ID is managed, and that the sixth representative hash value or its processed value calculated by using (I) the sixth specific hash value acquired by applying the hash function to the certificate of the service providing device and (II) at least one neighboring hash value corresponding to the sixth specific hash value, has been registered in the second blockchain database and that its corresponding fifth blockchain transaction ID is managed, the payment supporting server 200 may (i) retrieve the certificate of the service providing device registered in the first blockchain database using the second blockchain transaction ID corresponding to the identification information on the service providing device in the billing transaction obtained from the service providing device 110, or (ii) retrieve the certificate of the service providing device registered in the first blockchain database by referring to information on a Merkle tree and information on its leaf nodes, wherein the information on the Merkle tree and its leaf nodes is acquired from the first blockchain database registered to be corresponding to the sixth representative hash value or its processed value included in a data message which is acquired from the second blockchain database using the fifth blockchain transaction ID corresponding to the identification information on the service providing device in the billing transaction.

Then, if the billing transaction is determined as valid, the payment supporting server 200 may acquire the identification information on the digital wallet 130 set as the payer for the IoT device 120 by using the link information described in FIG. 2, at steps of S135 and S136.

For example, the payment supporting server 200 may transmit or support another device to transmit a request for the link information to the blockchain database 300 by referring to a transaction ID corresponding to the identification information on the IoT device in the billing transaction at a step of S135, and may acquire or support another device to acquire the link information from the blockchain database 300 at a step of S136.

Herein, a process of the payment supporting server 200 acquiring the link information if the blockchain database 300 is comprised of the first blockchain database and the second blockchain database is described in detail as follows.

On condition that the link information has been registered as described in FIG. 2, the payment supporting server 200 may (i) retrieve the link information registered in the first blockchain database using the first blockchain transaction ID corresponding to the identification information on the IoT device in the billing transaction obtained from the service providing device 110, (ii) retrieve a data message from the second blockchain database using a second blockchain transaction ID corresponding to the identification information on the IoT device in the billing transaction, (iii) retrieve information on a Merkle tree and information on its leaf nodes corresponding to the fourth representative hash value or its processed value included in the data message from the first blockchain database, and (iv) acquire the certificate of the service providing device registered in the first blockchain database referring to the retrieved information on the Merkle tree and its leaf nodes.

Then, using the identification information on the digital wallet 130 set as the payer for the IoT device 120 acquired by referring to the link information, the payment supporting server 200 may transmit or support another device to transmit a confirmation requesting transaction for payment to the digital wallet 130 at a step of S137. Herein, the confirmation requesting transaction for payment may include the billing detail, the identification information on the digital wallet, and a value for verification. The value for verification may include a nonce, an OTP, and a time-stamp, etc. But the scope of the present invention is not limited thereto, and may include any value for verification.

Next, the digital wallet 130 may display or support another device to display to the user device 131 a confirmation requesting signal for payment from the digital wallet 130 linked with the payer for the IoT device 120, at a step of S138.

Herein, if the user wants to approve the payment by the digital wallet 130, the user may input information for confirming to thereby approve the payment, at a step of S139. Herein, the inputted information for confirming may be information to access the certificate and the like, and may include at least one of a password, a PIN code, fingerprint information of the user, and biometric information of the user. Meanwhile, input of the information for confirming may be omitted as the case may be.

Then, the user device 131 may determine whether the inputted information for confirming is identical to predetermined information for confirming, and if they are determined as identical, may transmit a payment instructing signal to the digital wallet 130, at a step of S140.

Then, the digital wallet 130 may transmit or support another device to transmit a payment confirming transaction to the payment supporting server 200, at a step of S141. Herein, the payment confirming transaction may include the identification information on the digital wallet, and a signature value for verification acquired by signing the value for verification with the certificate of the digital wallet.

Then, the payment supporting server 200 may confirm validity of the payment confirming transaction acquired from the service providing device 110 at a step of S142.

For example, the payment supporting server 200 may (i) acquire the certificate of the digital wallet from the blockchain database 300 registered to be corresponding to the identification information on the digital wallet in the payment confirming transaction, and (ii) acquire the value for verification from the signature value for verification in the billing transaction by using the certificate of the digital wallet obtained from the blockchain database 300. Next, the payment supporting server 200 may determine if the value for verification acquired from the signature value for verification is identical to the value for verification in the payment confirming transaction, and if they are determined as identical, may determine the payment confirming transaction as valid.

Herein, a process of the payment supporting server 200 acquiring the certificate of the digital wallet if the blockchain database 300 is comprised of the first blockchain database and the second blockchain database is described in detail as follows.

On condition that the certificate of the digital wallet has been registered in the first blockchain database and its corresponding third blockchain transaction ID is managed, and that the second representative hash value or its processed value calculated by using (I) the second specific hash value acquired by applying the hash function to the certificate of the digital wallet and (II) at least one neighboring hash value corresponding to the second specific hash value, has been registered in the second blockchain database and that its corresponding sixth blockchain transaction ID is managed, the payment supporting server 200 may (i) retrieve the certificate of the digital wallet registered in the first blockchain database using the third blockchain transaction ID corresponding to the identification information on the digital wallet in the payment confirming transaction obtained from the digital wallet 130, or (ii) retrieve the certificate of the digital wallet registered in the first blockchain database by referring to information on a Merkle tree and information on its leaf nodes, wherein the information on the Merkle tree and its leaf nodes is acquired from the first blockchain database registered to be corresponding to the second representative hash value or its processed value included in a data message from the second blockchain database using the sixth transaction ID corresponding to the identification information on the digital wallet in the payment confirming transaction.

Then, if the payment confirming transaction is determined as valid, the payment supporting server 200 may transmit or support another device to transmit a request for payment for the IoT device 120 to the fund source server 400 corresponding to the fund source of the digital wallet 130, at a step of S143.

Thereafter, if the payment result for the IoT device is acquired from the fund source server 400, the payment supporting server 200 may register or support another device to register the payment result in the blockchain database 300 at a step of S145, may acquire and manage its corresponding transaction ID at a step of S146, and may transmit or support another device to transmit the payment result to at least one of the service providing device 110, the IoT device 120 and the digital wallet 130 at steps of S147, S148 and S149. Next, the service providing device 110 may transmit or support another device to transmit the payment result to the IoT device 120 at a step of S150. Further, the digital wallet 130 may display the payment result to the user device 131 to thereby allow the user to confirm the payment result at a step of S151.

Herein, if the blockchain database 300 is comprised of the first blockchain database and the second blockchain database, description of the payment supporting server 200 registering the payment result in the first blockchain database and the second blockchain database is easily inferred from the description of FIG. 6 and therefore omitted.

The above description shows that, in response to the billing transaction from the service providing device 110, the payment supporting server 200 may transmit the confirmation requesting transaction for payment to the digital wallet 130 to thereby allow the user to approve the payment, meanwhile, if the billing detail corresponds to a smart contract predetermined by the user, by using the identification information on the digital wallet acquired from the blockchain database 300, the payment supporting server 200 may transmit or support another device to transmit a request for payment for the billing detail to the fund source server corresponding to the digital wallet to allow the billing detail to be paid for, without any approval of the user.

Next, a detailed description of a process of the advance payment for the IoT device by referring to FIGS. 8 and 9 in accordance with one example embodiment of the present invention is as follows.

First, a process of registering the advance payment for the IoT device by referring to FIG. 8 in accordance with one example embodiment of the present invention is described as follows.

If the user inputs an advance payment registering signal using the user terminal 131 to register the advance payment for the IoT device at a step of S161, the digital wallet 130 may transmit or support another device to transmit a request for identification information on the IoT device to the IoT device 120 for which the user requested registration of the advance payment, at a step of S162. Herein, the request transmitted from the digital wallet 130 to the IoT device 120 may include the identification information on the digital wallet.

Then, in response to the received request for the identification information, the IoT device 120 may transmit or support another device to transmit the identification information on the IoT device to the digital wallet 130, at a step of S163.

The digital wallet 130 may display or support another device to display to the user device 131 a confirmation requesting signal for registering the advance payment, at a step of S164.

Herein, if the user wants to allow registering the advance payment for the IoT device 120, the user may input information for confirming to thereby allow the registration, at a step of S165.

Then, the user device 131 may determine whether the inputted information for confirming is identical to predetermined information for confirming, and if they are determined as identical, may transmit a registration confirming signal to the digital wallet 130, at a step of S166.

Then, the digital wallet 130 may transmit or support another device to transmit a registration requesting transaction for advance payment to the payment supporting server 200, at a step of S167. Herein, the registration requesting transaction for advance payment may include the identification information on the digital wallet, the identification information on the IoT device, registration requesting information for advance payment, and a signature value for requesting acquired by signing the registration requesting information with the certificate of the digital wallet.

Next, the payment supporting server 200 may confirm validity of the registration requesting transaction for advance payment acquired from the digital wallet 130, at a step of S168.

For example, the payment supporting server 200 may (i) acquire the certificate of the digital wallet from the blockchain database 300 registered to be corresponding to the identification information on the digital wallet in the registration requesting transaction for advance payment, and (ii) acquire the registration requesting information for advance payment from the signature value for requesting in the registration requesting transaction for advance payment by using the certificate of the digital wallet obtained from the blockchain database 300. Next, the payment supporting server 200 may determine if the registration requesting information for advance payment acquired from the signature value for requesting is identical to that in the registration requesting transaction for advance payment, and if they are determined as identical, may determine the registration requesting transaction as valid.

Herein, if the blockchain database 300 is comprised of the first blockchain database and the second blockchain database, description of the payment supporting server 200 acquiring the certificate of the digital wallet is easily inferred from the description of FIG. 6 and therefore omitted.

Thereafter, if the registration requesting transaction is determined as valid, the payment supporting server 200 may transmit or support another device to transmit a request for the advance payment for the IoT device 120 to the fund source server 400 corresponding to the fund source of the digital wallet 130, at a step of S169.

Thereafter, if a payment result of the advance payment for the IoT device is acquired from the fund source server 400 at a step of S170, the payment supporting server 200 may register the advance payment with the IoT device 120 at a step of S171, may register or support another device to register the registration result to the blockchain database 300 at a step of S172, may acquire and manage its corresponding transaction ID at a step of S173, and may transmit or support another device to transmit the registration result to at least one of the IoT device 120 and the digital wallet 130 at steps of S174 and S175. Further, the digital wallet 130 may display the registration result to the user device 131 to thereby allow the user to confirm the registration result at a step of S176.

Herein, a process of the payment supporting server 200 registering the registration result to the first blockchain database and the second blockchain database if the blockchain database 300 is comprised of the first blockchain database and the second blockchain database is described in detail as follows.

The payment supporting server 200 may register or support another device to register the registration result to the first blockchain database, and may acquire or support another device to acquire a first blockchain transaction ID of the registration result representing a location of the registration result in the first blockchain database from the first blockchain database.

Next, if one of the anchoring conditions for registering a hash value in the second blockchain database is satisfied, the payment supporting server 200 may generate the third representative hash value or its processed value, which is a Merkle root, calculated by using (i) the third specific hash value acquired by applying the hash function to the registration result, and (ii) at least one neighboring hash value corresponding to the third specific hash value.

Also, the payment supporting server 200 may register or support another device to register the third representative hash value or its processed value in the second blockchain database, and may acquire or support another device to acquire the second blockchain transaction ID of the registration result representing a location of the third representative hash value or its processed value registered in the second blockchain database from the second blockchain database.

Herein, the payment supporting server 200 may store and manage the third specific hash value and its corresponding at least one neighboring hash value in a certain data structure. Herein, the data structure may vary and one example may be a Merkle tree.

In other words, the payment supporting server 200 may create or support another device to create a Merkle tree whose specific leaf node has the third specific hash value, and if the at least one of the anchoring conditions is satisfied, the payment supporting server 200 may register or support another device to register the third representative hash value or its processed value in the second blockchain database, where the third representative hash value is calculated by using the third specific hash value and at least one hash value of at least one neighboring node which corresponds to the node of the third specific hash value.

More specifically, (x1) the payment supporting server 200 may calculate or support another device to calculate an intermediate value by using (i) the third specific hash value and (ii) a hash value allocated to a sibling node of a specific leaf node where the third specific hash value is allocated, and may allocate or support another device to allocate a hash value of the intermediate value to a parent node of the specific leaf node. (x2) If the parent node is a root node of the Merkle tree, the hash value allocated to the parent node becomes the third representative hash value. (x3) If the parent node is not the root node, the payment supporting server 200 may repeat the processes from (x1) to (x3) by regarding the hash value allocated to the parent node as the third specific hash value and regarding the parent node as the specific leaf node.

The payment supporting server 200 may register or support another device to register the hash value allocated to the root node as the third representative hash value to the second blockchain database. Herein, a processed value of the third representative hash value may be registered. For example, a value from hex operation on the third representative hash value may be registered.

On the other hand, if the payment supporting server 200 stores the third specific hash value and the at least one neighboring hash value in a 3-1st data structure and then stores and manages a 3-2nd data structure identical in a form to the 3-1st data structure, the 3-1st data structure and the 3-2nd data structure may be connected in a form of a chain.

Especially, as aforementioned, if the 3-1st data structure and the 3-2nd data structure are Merkle trees, a root value of the 3-1st data structure or a hash value of the root value may be allocated to a first leaf node of the 3-2nd data structure.

Moreover, data integrity may be further ensured by verifying the 3-1st data structure when the 3-2nd data structure is created.

Further, in case of a first Merkle tree among at least two Merkle trees connected in a form of a chain, a hash value of a certain message data comprised of text, number or symbol, or a processed value of the hash value may be allocated to a first leaf node of the first Merkle tree. For example, at the time of creation of a Merkle tree, a hash value of an input message firstly given by the payment supporting server 200 may be allocated.

Meanwhile, the description of FIGS. 3 and 4 explains a Merkle tree similar to that created according to the registration result, therefore detailed explanation is omitted.

Also, when registering the advance payment for the IoT device 120, the payment supporting server 200 may register a predetermined advance payment as the advance payment corresponding to the IoT device 120 if the advance payment registered to be corresponding to the IoT device 120 falls below a predetermined threshold, in response to the smart contract predetermined by the user. That is, according to the aforementioned method, the payment supporting server 200 may transmit a request for payment corresponding to a predetermined advance payment by the digital wallet to the fund source server 400, and if the payment is made, the payment supporting server 200 may register the result in the blockchain database 300, and may transmit or support another device to transmit the result to the IoT device 120 and the digital wallet 130.

Figure 8:
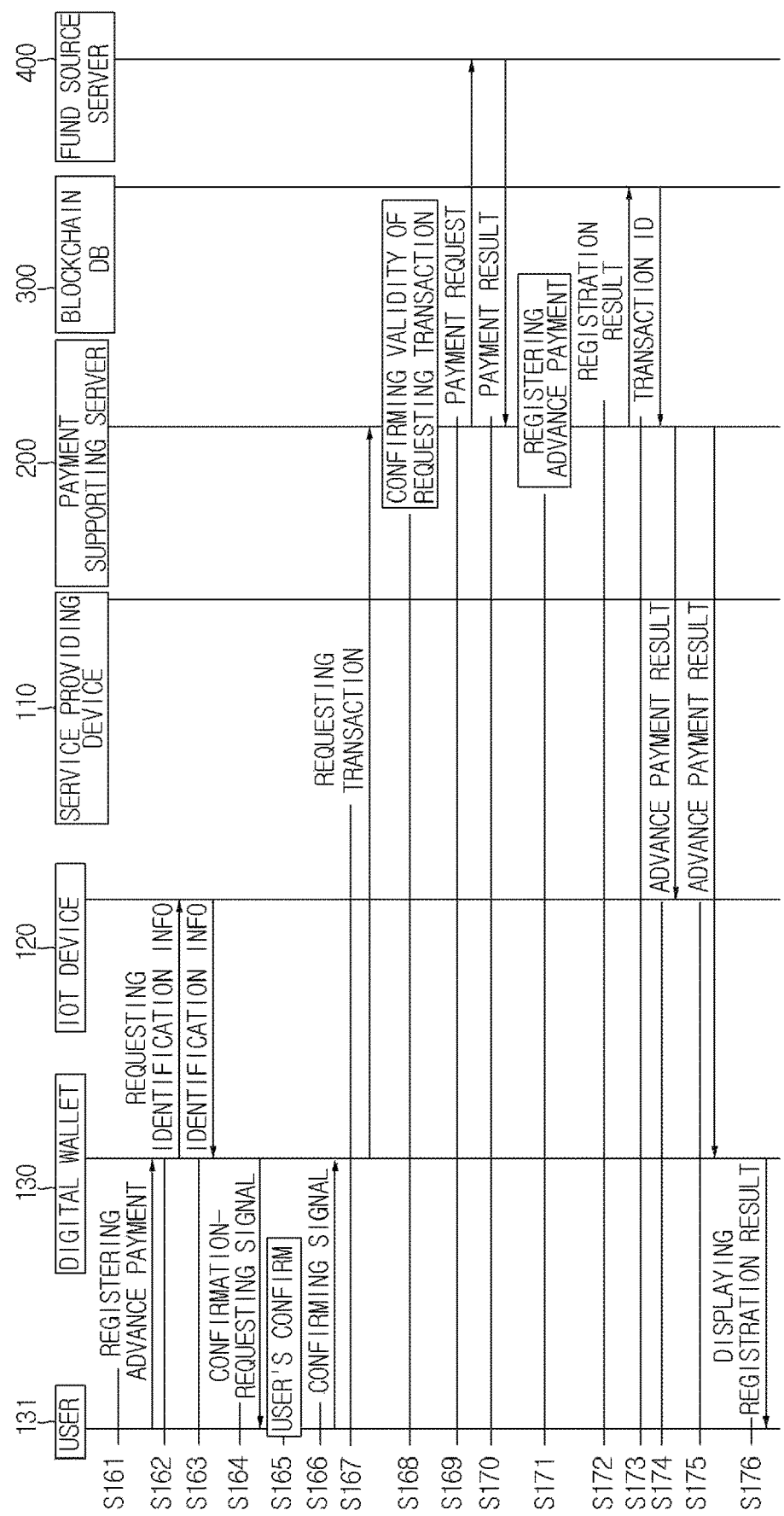
FIG. 8 is a drawing schematically illustrating a process of registering an advance payment for the cost generated at the IoT device in accordance with one example embodiment of the present invention.
Figure 9:
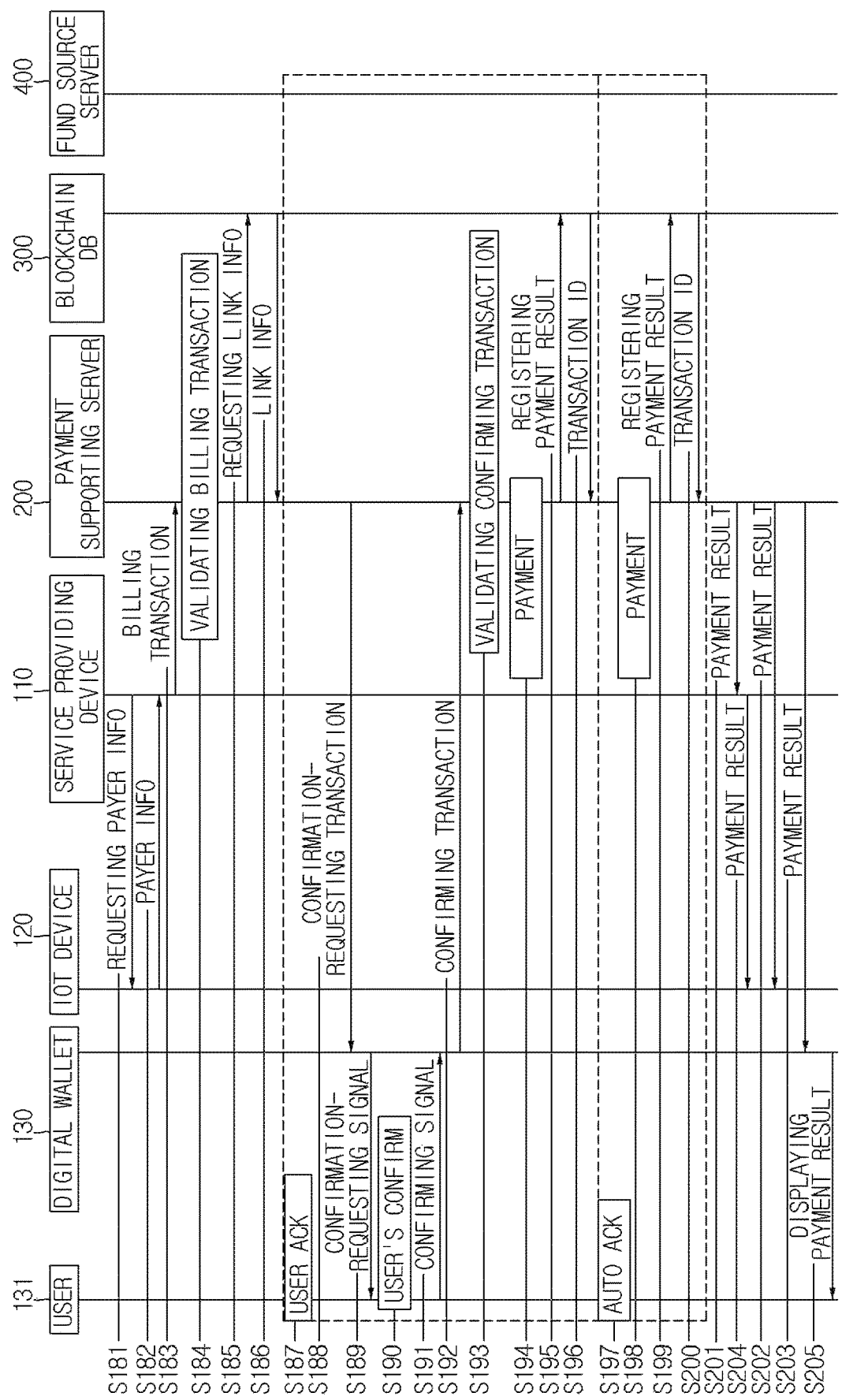
FIG. 9 is a drawing schematically illustrating a process of using the advance payment for the cost generated at the IoT device in accordance with one example embodiment of the present invention.

Next, on condition that the advance payment has been registered with the IoT device as in the description of FIG. 8, a process of the advance payment for the IoT device in accordance with one example embodiment of the present invention is described by referring to FIG. 9.

If the service providing device 110 of the service provider transmits a request for information on the payer including the identification information on the IoT device to the IoT device 120, for billing a product or a service purchased or used via the IoT device 120 by the user at a step of S181, the IoT device 120 may transmit or support another device to transmit the identification information on the IoT device to the service providing device 110 corresponding to the identification information on the service providing device included in the request at a step of S182.

Then, the service providing device 110 may transmit or support another device to transmit the billing transaction by referring to the identification information on the IoT device acquired from the IoT device 120 to the payment supporting server 200 at a step of S183. Herein, the billing transaction may include the identification information on the service providing device, the identification information on the IoT device, the billing detail, and the signature value for billing acquired by signing the billing detail with the certificate of the service providing device.

Then, if the billing transaction is acquired from the service providing device 110, the payment supporting server 200 may confirm validity of the billing transaction acquired from the service providing device 110 at a step of S184.

Herein, description of confirming the validity of the billing transaction is easily inferred from the description of FIG. 6 and therefore omitted.

Then, if the billing transaction is determined as valid, the payment supporting server 200 may acquire the identification information on the digital wallet 130 set as the payer for the IoT device 120 by using the link information described in FIG. 2, at steps of S185 and S186.

Herein, if there is a smart contract predetermined by the user, the payment may be made according to the smart contract. For example, the smart contract may require the user's approval as in a step of S187, or may not require the user's approval as in a step of S197 which is the step of an automated approval.

In the case of the smart contract requiring the user's approval as in the step of S187, using the identification information on the digital wallet 130 set as the payer for the IoT device 120 acquired by referring to the link information, the payment supporting server 200 may transmit or support another device to transmit a confirmation requesting transaction for payment to the digital wallet 130 at a step of S188. Herein, the confirmation requesting transaction for payment may include the billing detail, the identification information on the digital wallet, and a value for verification.

Then, the digital wallet 130 may display or support another device to display to the user device 131 a confirmation requesting signal for payment by the digital wallet 130 as the payer for the IoT device 120, at a step of S189.

Herein, if the user wants to approve the payment by the digital wallet 130 linked as the payer, the user may input information for confirming to thereby approve the payment, at a step of S190.

Then, the user device 131 may determine whether the inputted information for confirming is identical to predetermined information for confirming, and if they are determined as identical, may transmit a payment instructing signal to the digital wallet 130, at a step of S191.

Then, the digital wallet 130 may transmit or support another device to transmit a payment confirming transaction to the payment supporting server 200, at a step of S192. Herein, the payment confirming transaction may include the identification information on the digital wallet, and a signature value for verification acquired by signing the value for verification with the certificate of the digital wallet.

Then, the payment supporting server 200 may confirm validity of the payment confirming transaction acquired from the service providing device 110 at a step of S193. Herein, description of confirming the validity of the payment confirming transaction is easily inferred from the description of FIG. 7 and therefore omitted.

Then, if the payment confirming transaction is determined as valid, the payment supporting server 200 may allow the cost billed by the service providing device 110 to be paid by the advance payment of the the IoT device 120, and transmit or support another device to transmit a request for payment for the IoT device 120 to the fund source server 400 corresponding to the fund source of the digital wallet 130, at a step of S194.

Thereafter, the payment supporting server 200 may register or support another device to register the payment result from the advance payment for the IoT device in the blockchain database 300 at a step of S195, may acquire and manage its corresponding transaction ID at a step of S196, and may transmit or support another device to transmit the payment result to at least one of the service providing device 110, the IoT device 120 and the digital wallet 130 at steps of S201, S202 and S203. Next, the service providing device 110 may transmit or support another device to transmit the payment result to the IoT device 120 at a step of S204. Further, the digital wallet 130 may display the payment result to the user device 131 to thereby allow the user to confirm the payment result at a step of S205.

Herein, if the blockchain database 300 is comprised of the first blockchain database and the second blockchain database, description of the payment supporting server 200 registering the payment result to the first blockchain database and the second blockchain database is easily inferred from the description of FIG. 6 and therefore omitted.

As opposed to the above case where the user's approval is required, in the case of the automated approval according to the smart contract predetermined by the user as in the step of S197, the payment supporting server 200, without the user's approving process, may use the advance payment registered to be corresponding to the IoT device via the identification information on the digital wallet acquired from the blockchain database 300 to pay or support another device to pay for the billing detail from the service providing device 110 at a step of S198. Herein, in the case of the automated approval by the smart contract, the billing detail may include at least one of micro-payment, repeated payment of a same amount, and repeated payment of an amount less than a predetermined threshold, but the scope of the present invention is not limited thereto, and may include any payment set by the user as utilizing an automated approval.

Thereafter, as the above-mentioned, the payment supporting server 200 may register or support another device to register the payment result in the blockchain database 300, may acquire and manage its corresponding transaction ID at a step of S200, and may transmit or support another device to transmit the payment result to at least one of the service providing device 110, the IoT device 120 and the digital wallet 130 at steps of S201, S202 and S203.

Then, if the billing transaction acquired from the service providing device 110 is determined as valid, without confirming the link information, the payment supporting server 200 may use the advance payment registered to be corresponding to the identification information on the IoT device 120 in the billing transaction to thereby allow the bill to be paid for.

Figure 10:
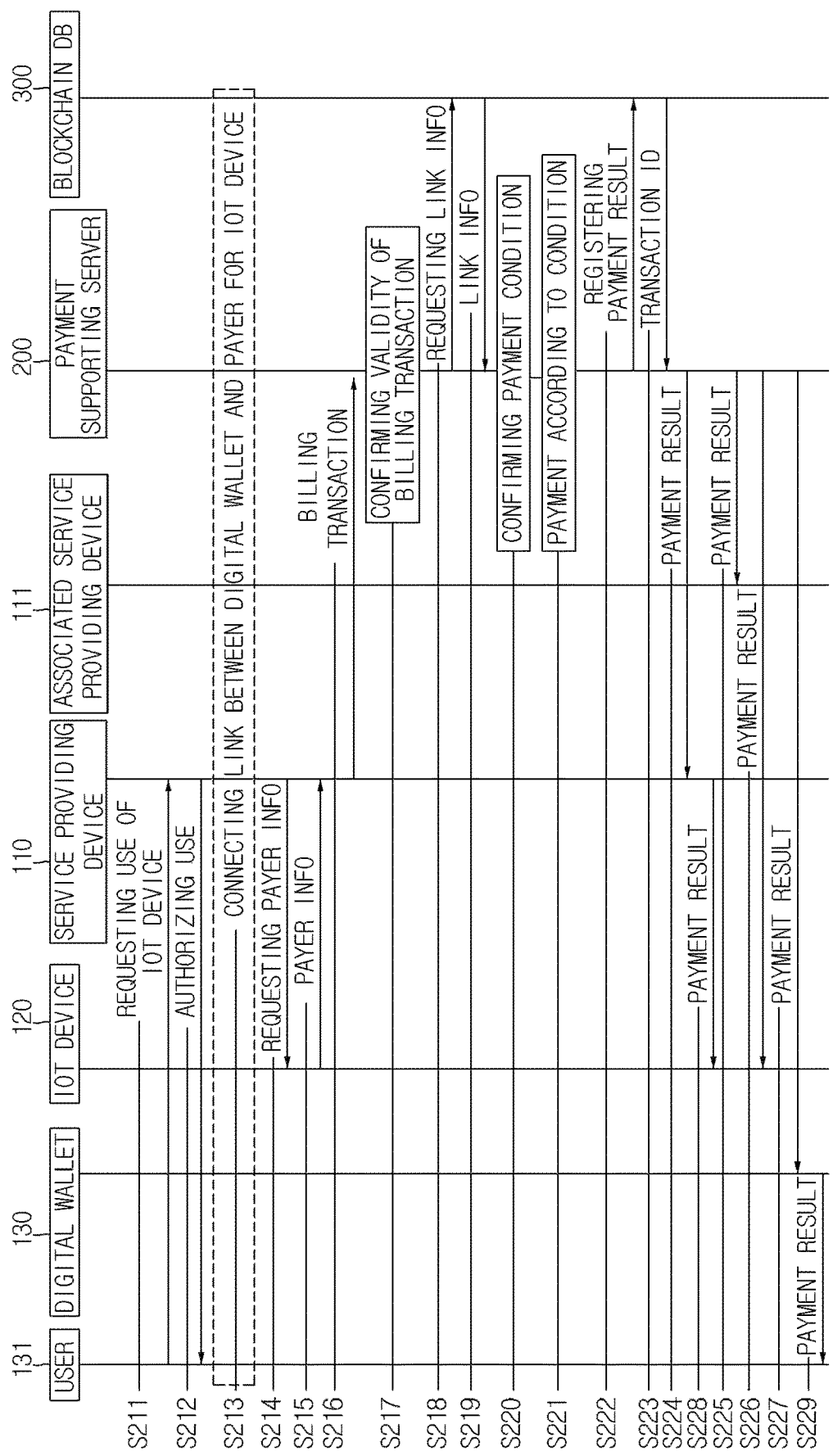
FIG. 10 is a drawing schematically illustrating a process of the payment for the cost generated at the IoT device using a smart contract in accordance with one example embodiment of the present invention.

Next, a detailed description of settling the bill for the IoT device using the smart contract by referring to FIG. 10 in accordance with one example embodiment of the present invention is as follows.

If the user transmits a request to the service providing device 110 for use of the IoT device 120 corresponding to cars, houses, hotel rooms for rent or use at a step of S211, and if the service providing device 110 authorizes the request at a step of S212, the payment supporting server 200 may establish the link between the IoT device 120 and the digital wallet 130 as the payer therefor by a process shown in FIG. 2 at a step of S213.

Thereafter, the service providing device 110 may acquire the identification information on the IoT device at a step of S215 by transmitting a request for information on the payer to the IoT device 120 at a step of S214 to bill for the IoT device 120, and may transmit or support another device to transmit the billing transaction at a step of S216. Herein, the billing transaction at a step of S216 may include the identification information on the service providing device, the identification information on the IoT device, the smart contract, the billing detail, and the signature value for billing acquired by signing the billing detail with the certificate of the service providing device. Further, the smart contract may include one or more payment conditions for the billing detail. For example, the smart contract may include the payment conditions for costs like a billed cost for the service providing device, a billed cost for the IoT device, an insurance fee regarding use of the IoT device, and a billed cost for associated service providing devices 111 related to use or rent via the IoT device, etc. Herein, the associated service providing devices provide one or more services related to the service provided by the the service providing device. Further, in case of the rented cars, the smart contract may include a server of the police, and if the rented cars are not returned in time, the police may receive an automated report. The smart contract may further include conditions for covering repairs to devices or installations for use or rent.

Then, the payment supporting server 200 may confirm validity of the billing transaction at a step of S217 as in FIG. 6, and if the billing transaction is determined as valid, may acquire the link information from the blockchain database 300, at steps of S218 and S219.

Next, the payment supporting server 200 may confirm the payment conditions, i.e., the smart contract, at a step of S220, and then, using the fund source of the digital wallet 130 by referring to the acquired link information, pay the cost for the service providing device 110 and its associated service providing devices 111 according to the smart contract at a step of S221.

Thereafter, the payment supporting server 200 may transmit or support another device to transmit the payment result to at least one of the service providing device 110, the associated service providing devices 111, the IoT device 120, and the digital wallet at steps of S224, S225, S226, and S227. Next, the service providing device 110 may transmit or support another device to transmit the payment result to the IoT device 120 at a step of S228. Further, the digital wallet 130 may display the payment result to the user device 131 to thereby allow the user to confirm the payment result at a step of S229.

Meanwhile, the IoT device 120 used by the user is described above as a device separate from the service providing device 110, however, the service providing device 110 may be included in the IoT device 120, in which case, the digital wallet may acquire the identification information on the IoT device when an authorizing signal of use of the IoT device is received.

Further, the service providing device 110 is described above as transmitting the billing transaction to the payment supporting server 200, however, the service providing device 110 may transmit the billing signal including the billing detail and information on the smart contract having the payment conditions to the digital wallet 130. Herein, the smart contract may be pre-registered in the blockchain database 300 by the service providing device 110.

Also, in response to the billing signal from the service providing device 110, the digital wallet 130 may transmit a payment requesting transaction including the identification information on the digital wallet, the billing detail, and the smart contract to the payment supporting server 200.

Then, the payment supporting server 200 may transmit to the digital wallet 130 a verification requesting signal for the digital wallet including the value for verification and the identification information on the digital wallet in the payment requesting transaction, and if a verification confirming signal including a signature value obtained by signing the identification information on the digital wallet and the value for verification with the certificate of the digital wallet is acquired from the digital wallet 130, may confirm validity of the verification confirming signal to thereby verify the digital wallet as described in FIG. 6.

Then, if the digital wallet 130 is determined as valid, the payment supporting server 200 may acquire the smart contract from the blockchain database 300 by using the information on the smart contract in the payment requesting transaction, and may transmit payment for the IoT device 130 or the service providing device 110, and for the associated service providing devices 131 according to conditions of the acquired smart contract.

The present invention has an effect of managing efficiently the IoT device related to the payment by connecting and disconnecting the link between the IoT device and the digital wallet as the payer therefor.

The present invention has another effect of enabling the user not registered in the payment system of the service provider to use the payment service by allowing a direct request for the payment to the IoT device.

The present invention has still another effect of improved security of keeping information on the user from the service providers, etc. by paying the bill for the IoT device using the digital wallet linked with the IoT device.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method of a payment for an Internet of Things (IoT) device, comprising steps of:
   registering, by a payment supporting server, (I) a certificate of a service providing device and a certificate of the digital wallet in a first blockchain database;
   managing, by the payment supporting server, a corresponding first, second and third blockchain transaction IDs of the certificate of the IoT device, the certificate of the service providing device and the certificate of the digital wallet registered in the first blockchain database
   acquiring a specific hash value for each of the certificates by applying a hash function to each of the certificates;

calculating a respective hash value for each of the certificates by using:
(II-1) the specific hash values for each of the certificates and,
(II-2) at least one neighboring hash value for each of the specific hash values, the at least one neighboring hash value for each of the specific hash values is each a hash value of at least one other transaction registered in the first blockchain database in one of anchoring conditions;
registering, by the payment supporting server, (II) the representative hash value for each of the certificates in a second blockchain database;
managing, by the payment supporting server, a corresponding fourth, fifth and sixth blockchain transaction IDs of the representative hash values registered in the second blockchain database,
(a) performing, by a digital wallet of a user, processes of:
(i) acquiring identification information on the IoT device from the IoT device in response to a link-connection requesting signal from a user device, and displaying a confirmation requesting signal on whether a link between the IoT device and the digital wallet as a payer therefor is to be established on the user device,
(ii) transmitting, when a link-connection instructing signal on the link is acquired from the user device, a link-connection requesting transaction to the payment supporting server, wherein the link-connection requesting transaction includes identification information on the digital wallet, the identification information on the IoT device and a signature value for identification acquired by signing the identification information on the IoT device with the certificate of the digital wallet;
(1) verifying, by the payment supporting server, the IoT device corresponding to the identification information on the IoT device included in the link-connection requesting transaction,
(2) connecting, by the payment supporting server, the link when the IoT device is determined as valid,
(3) registering, by the payment supporting server, link information on the link in the first blockchain database and manage a corresponding first link-info blockchain transaction ID of the link information registered in the first blockchain database,
(4) (4-1) registering, by the payment supporting server, in the second blockchain database, when one of the anchoring conditions is satisfied, a fourth representative hash value calculated by using (i) a fourth specific hash value acquired by applying the hash function to the link information and (ii) a corresponding at least one neighboring hash value,
(4-2) managing, by the payment supporting server, a corresponding second link-info blockchain transaction ID of the fourth representative hash value registered in the second blockchain database, and
(4-3) transmitting, by the payment supporting server, the link information to at least one of the IoT device and the digital wallet; and
acquiring, by the digital wallet, a confirmation requesting transaction on a billing detail corresponding to the identification information on the digital wallet from the payment supporting server;

(b) performing, by the digital wallet, processes of:
(i) displaying a confirmation requesting signal for the billing detail through a display of the user device, and
(ii) transmitting, when a confirming signal of the user on the billing detail is acquired from the user device, a confirming transaction including the identification information on the digital wallet and a signature value for verification acquired by signing a value for verification with the certificate of the digital wallet to the payment supporting server;
(I) verifying, by the payment supporting server, the confirming transaction,
determining, by the payment supporting server, the confirming transaction as valid, and
(II) transmitting, by the payment supporting server, amount of the billing detail to a fund source server corresponding to the digital wallet or determine an advance payment prepared for the IoT device to be used,
wherein the confirmation requesting transaction is generated at the payment supporting server via acquiring the identification information on the digital wallet corresponding to the identification information on the IoT device included in a billing transaction for the IoT device retrieved from the first blockchain database by referring to the link information, in response to the billing transaction which additionally includes the billing detail, a signature value for billing acquired by signing the billing detail with the certificate of the service providing device and the identification information on the service providing device acquired from the service providing device, and wherein the confirmation requesting transaction further includes the billing detail, the identification information on the digital wallet and the value for verification,
wherein, the anchoring conditions include at least one of (i) a condition that one or more transactions related to the payment for the IoT device are created a certain number of times, (ii) a condition that a certain amount of time is elapsed, (iii) a condition that a block is created in the first blockchain database, and (iv) a condition that has at least one of characteristics of services.

2. The method of claim 1, before the step of (b), further comprising steps of:
(b01) performing, by the digital wallet, processes of acquiring the identification information on the IoT device from the IoT device by referring to a registering signal for the advance payment from the user device, and of displaying a confirmation requesting signal for registration of the advance payment through the display of the user device; and
(b02) transmitting, by the digital wallet, when a registration confirming signal of the advance payment is acquired from the user device, a registration requesting transaction including the identification information on the digital wallet, the identification information on the IoT device, information on a registration request for the advance payment and a signature value for request acquired by signing the information on the registration request with the certificate of the digital wallet to the payment supporting server;
(I) verifying, by the payment supporting server, the registration requesting transaction,
(II) registering, by the payment supporting server, the advance payment for the IoT device by approving payment for the information on the registration request by using the digital wallet corresponding to the identification information on the digital wallet included in the registration requesting transaction when the registration requesting transaction is determined as valid, (III) registering, by the payment supporting server, a result of an advance payment registration in the first blockchain database, and manage a corresponding first payment-info blockchain transaction ID of the result registered in the first blockchain database, and (IV) registering, by the payment supporting server, in the second blockchain database, when one of the anchoring conditions is satisfied, a third representative hash value calculated by using (IV-1) a third specific hash value acquired by applying the hash function to the result of the advance payment registration and (IV-2) a corresponding at least one neighboring hash value, and manage a corresponding second payment-info blockchain transaction ID of the third representative hash value registered in the second blockchain database, and (V) transmit the result of the advance payment registration to at least one of the IoT device and the digital wallet.

3. The method of claim 1, wherein the step of (a) includes steps of:

(a01) performing, by the digital wallet, processes of acquiring the identification information on the IoT device from the IoT device by referring to a link-disconnection requesting signal from the user device, and of displaying a confirmation requesting signal for disconnecting the link through the display of the user device; and (a02) transmitting, by the digital wallet, when a link-disconnection instructing signal for disconnecting the link is acquired from the user device, a disconnection requesting transaction including the identification information on the digital wallet, the identification information on the IoT device and a signature value for request acquired by signing the identification information on the IoT device with the certificate of the digital wallet to the payment supporting server;

(I) verifying, by the payment supporting server, the IoT device corresponding to the identification information on the IoT device included in the disconnection requesting transaction, (II) disconnecting, by the payment supporting server, the link when the IoT device is determined as valid, (III) registering, by the payment supporting server, disconnection information in the first blockchain database, and manage a corresponding first link-disconnection blockchain transaction ID of the disconnection information registered in the first blockchain database, (IV) registering, by the payment supporting server, in the second blockchain database, when one of the anchoring conditions is satisfied, a fifth representative hash value calculated by using (IV-1) a fifth specific hash value acquired by applying the hash function to the disconnection information and (IV-2) a corresponding at least one neighboring hash value, and manage a corresponding second disconnection-info blockchain transaction ID of the fifth representative hash value registered in the second blockchain database, and (V) transmit the disconnection information to at least one of the IoT device and the digital wallet.

4. A system for a payment for an Internet of Things (IoT) device, comprising:

a payment supporting servicer configured to:

(I) register a certificate of the IoT device, a certificate of a service providing device and a certificate of the digital wallet in a first blockchain database;

manages a corresponding first, second and third blockchain transaction IDs of the certificate of the IoT device, the certificate of the service providing device and the certificate of the digital wallet registered in the first blockchain database;

acquire a specific hash value for each of the certificates by applying a hash function to each of the certificates;

calculate a respective hash value for each of the certificates by using:

(II-1) the specific hash values for each of the certificates and, (II-2) at least one neighboring hash value for each of the specific hash values, the at least one neighboring hash value for each of the specific hash values is each a hash value of at least one other transaction registered in the first blockchain database in one of anchoring conditions;

(II) register the representative hash value for each of the certificates in a second blockchain database, and manages their corresponding fourth, fifth and sixth blockchain transaction IDs of the representative hash values registered in the second blockchain database;

a user device including a digital wallet of the user, the user device is configured to:

transmit a link-connection requesting signal to the IoT device;

acquire identification information on the IoT device from the IoT device;

(I) display a confirmation requesting signal on whether a link between the IoT device and the digital wallet as a payer therefor is to be established on the user device, (II) transmit, a link-connection requesting transaction to the payment supporting server, wherein the link-connection requesting transaction includes identification information on the digital wallet, the identification information on the IoT device and a signature value for identification acquired by signing the identification information on the IoT device with the certificate of the digital wallet;

the payment supporting server is further configured to:

(1) verify the IoT device corresponding to the identification information on the IoT device included in the link-connection requesting transaction, (2) connect the link when the IoT device is determined as valid, (3) register link information on the link in the first blockchain database and manage a corresponding first link-info blockchain transaction ID of the link information registered in the first blockchain database, (4) (4-1) register in the second blockchain database, when one of the anchoring conditions is satisfied, a fourth representative hash value calculated by using (i) a fourth specific hash value acquired by applying the hash function to the link information and (ii) a corresponding at least one neighboring hash value, (4-2) manage a corresponding second link-info blockchain transaction ID of the fourth representative hash value registered in the second blockchain database, and (4-3) transmit the link information to at least one of the IoT device and the digital wallet;

the user device is further configured to:

acquire a confirmation requesting transaction on a billing detail corresponding to the identification information on the digital wallet from the payment supporting server;

(III) (i) displaying a confirmation requesting signal for the billing detail through a display of the user device, and (ii) transmit a confirming transaction including the identification information on the digital wallet and a signature value for verification acquired by signing a value for verification with the certificate of the digital wallet to the payment supporting server;

the payment supporting server is further configured to:

verify the confirming transaction;

determining the confirming transaction as valid, and transmit amount of the billing detail to a fund source server corresponding to the digital wallet or determine an advance payment prepared for the IoT device to be used, wherein the confirmation requesting transaction is generated at the payment supporting server via acquiring the identification information on the digital wallet corresponding to the identification information on the IoT device included in a billing transaction for the IoT device retrieved from the first blockchain database by referring to the link information, in response to the billing transaction which additionally includes the billing detail, a signature value for billing acquired by signing the billing detail with the certificate of the service providing device, and the identification information on the service providing device acquired from the service providing device, and wherein the confirmation requesting transaction further includes the billing detail, the identification information on the digital wallet, and the value for verification, wherein, the anchoring conditions include at least one of (i) a condition that one or more transactions related to the payment for the IoT device are created a certain number of times, (ii) a condition that a certain amount of time is elapsed, (iii) a condition that a block is created in the first blockchain database, and (iv) a condition that has at least one of characteristics of services.

5. The system of claim 4, wherein the user device before performing the process (III), is further configured to:

(III-01) acquire the identification information on the IoT device from the IoT device by referring to a registering signal for the advance payment from the user device, and of displaying a confirmation requesting signal for registration of the advance payment through the display of the user device; and (III-02) transmit, when a registration confirming signal of the advance payment is acquired from the user device, a registration requesting transaction including the identification information on the digital wallet, the identification information on the IoT device, information on a registration request for the advance payment and a signature value for request acquired by signing the information on the registration request with the certificate of the digital wallet to the payment supporting server;

the payment supporting server is further configured to:

verify the registration requesting transaction; register the advance payment for the IoT device by approving payment for the information on the registration request by using the digital wallet corresponding to the identification information on the digital wallet included in the registration requesting transaction when the registration requesting transaction is determined as valid;

register a result of an advance payment registration in the first blockchain database, and manage a corresponding first payment-info blockchain transaction ID of the result registered in the first blockchain database; and register in the second blockchain database, when one of the anchoring conditions is satisfied, a third representative hash value calculated by using a third specific hash value acquired by applying the hash function to the result of the advance payment registration and a corresponding at least one neighboring hash value, and manage a corresponding second payment-info blockchain transaction ID of the third representative hash value registered in the second blockchain database; and transmit the result of the advance payment registration to at least one of the IoT device and the digital wallet.

6. The system of claim 4, wherein the user device is further configured to:

(i-01) acquire the identification information on the IoT device from the IoT device by referring to a link-disconnection requesting signal from the user device, and of displaying a confirmation requesting signal for disconnecting the link through the display of the user device; and (i-02) transmit a disconnection requesting transaction including the identification information on the digital wallet, the identification information on the IoT device and a signature value for request acquired by signing the identification information on the IoT device with the certificate of the digital wallet to the payment supporting server;

the payment supporting server is further configured to:

verify the IoT device corresponding to the identification information on the IoT device included in the disconnection requesting transaction;

disconnect the link when the IoT device is determined as valid;

register disconnection information in the first blockchain database, and manage a corresponding first link-disconnection blockchain transaction ID of the disconnection information registered in the first blockchain database;

register in the second blockchain database, when one of the anchoring conditions is satisfied, a fifth representative hash value calculated by using a fifth specific hash value acquired by applying the hash function to the disconnection information and a corresponding at least one neighboring hash value, and manage a corresponding second disconnection-info blockchain transaction ID of the fifth representative hash value registered in the second blockchain database; and transmit the disconnection information to at least one of the IoT device and the digital wallet.

\* \* \* \* \*